United States Patent
Hu

(10) Patent No.: US 10,267,937 B2
(45) Date of Patent: Apr. 23, 2019

(54) GENERATING SUBTERRANEAN IMAGING DATA BASED ON VERTICAL SEISMIC PROFILE DATA AND OCEAN BOTTOM SENSOR DATA

(71) Applicant: Saudi Arabian Oil Company, Dhahran (SA)

(72) Inventor: Leon Liang Zie Hu, Dhahran (SA)

(73) Assignee: Saudi Arabian Oil Company (SA)

( * ) Notice: Subject to any disclaimer, the term of this patent is extended or adjusted under 35 U.S.C. 154(b) by 315 days.

(21) Appl. No.: 15/298,135

(22) Filed: Oct. 19, 2016

(65) Prior Publication Data

US 2017/0038490 A1    Feb. 9, 2017

Related U.S. Application Data

(63) Continuation-in-part of application No. 14/473,822, filed on Aug. 29, 2014, now Pat. No. 9,562,983.
(Continued)

(51) Int. Cl.
*G01V 1/36* (2006.01)
*G01V 1/48* (2006.01)
(Continued)

(52) U.S. Cl.
CPC .............. *G01V 1/362* (2013.01); *G01V 1/30* (2013.01); *G01V 1/38* (2013.01); *G01V 1/42* (2013.01);
(Continued)

(58) Field of Classification Search
None
See application file for complete search history.

(56) References Cited

U.S. PATENT DOCUMENTS 5,500,832 A    3/1996 Berryhill
6,035,256 A    3/2000 Stankovic
(Continued)

FOREIGN PATENT DOCUMENTS

WO    2015160652    10/2015

OTHER PUBLICATIONS

Du et al., "Multicomponent joint migration velocity analysis in the angle domain for PP-waves and PS-waves" Society of Exploration Geophysicists, 2012 (Year: 2012).*
(Continued)

*Primary Examiner* — John C Kuan
(74) *Attorney, Agent, or Firm* — Fish & Richardson P.C.

(57) ABSTRACT

Example computer-implemented method, computer-readable media, and computer system are described for generating subterranean imaging data based on initial isotropic and/or anisotropic velocity models for the vertical seismic profile (VSP) data and stored ocean bottom sensor (OBS) data. In some aspects, VSP data and OBS data of a subterranean region are received. Angle attributes for each image point are computed to image primary reflection and free surface multiples of the received VSP data and OBS data, respectively. Angle-domain common-image gathers (ADCIG) are generated according to a ray-equation method based on the angle attributes computed based on the received VSP data and OBS data, respectively. The ADCIG are further post-processed.

16 Claims, 23 Drawing Sheets
(17 of 23 Drawing Sheet(s) Filed in Color)

Related U.S. Application Data

(60) Provisional application No. 61/980,878, filed on Apr. 17, 2014.

(51) Int. Cl.
  *G01V 1/30* (2006.01)
  *G01V 1/38* (2006.01)
  *G01V 1/42* (2006.01)

(52) U.S. Cl.
  CPC .......... *G01V 1/48* (2013.01); *G01V 2210/161* (2013.01); *G01V 2210/51* (2013.01); *G01V 2210/586* (2013.01); *G01V 2210/63* (2013.01); *G01V 2210/671* (2013.01); *G01V 2210/675* (2013.01)

(56) References Cited

U.S. PATENT DOCUMENTS

| | | | |
|---|---|---|---|
| 7,584,056 B2 * | 9/2009 | Koren | G01V 1/28 175/50 |
| 8,537,638 B2 | 9/2013 | Lee | |
| 8,756,042 B2 | 6/2014 | Tan | |
| 2002/0042678 A1 | 4/2002 | Bevc et al. | |
| 2002/0049540 A1 | 4/2002 | Bevc | |
| 2003/0130796 A1 | 7/2003 | Wiggins | |
| 2005/0088913 A1 | 4/2005 | Lecomte | |
| 2005/0273266 A1 * | 12/2005 | Nickel | G01V 1/286 702/14 |
| 2008/0109168 A1 | 5/2008 | Koren | |
| 2008/0130411 A1 | 6/2008 | Brandsberg-Dahl | |
| 2009/0257308 A1 | 10/2009 | Bevc | |
| 2009/0296524 A1 | 12/2009 | Meier | |
| 2010/0114494 A1 | 5/2010 | Higinbotham | |
| 2010/0118653 A1 | 5/2010 | He | |
| 2010/0118654 A1 | 5/2010 | He | |
| 2010/0135115 A1 | 6/2010 | Sun | |
| 2010/0220895 A1 | 9/2010 | Koren | |
| 2011/0103187 A1 | 5/2011 | Albertin | |
| 2012/0020186 A1 | 1/2012 | Luo | |
| 2012/0092962 A1 | 4/2012 | Nichols et al. | |
| 2012/0095690 A1 | 4/2012 | Higg | |
| 2012/0218861 A1 | 8/2012 | Xia | |
| 2012/0275268 A1 | 11/2012 | Bing et al. | |
| 2012/0281501 A1 | 11/2012 | Osypoov | |
| 2013/0064431 A1 * | 3/2013 | Winbow | G01V 1/282 382/109 |
| 2013/0185032 A1 | 7/2013 | Archer | |
| 2013/0265852 A1 | 10/2013 | Nichols | |
| 2014/0133275 A1 | 5/2014 | Guan | |
| 2014/0200813 A1 | 7/2014 | Montel | |
| 2014/0226437 A1 | 8/2014 | Chambers | |
| 2014/0301165 A1 | 10/2014 | Nichols | |
| 2015/0078124 A1 | 3/2015 | Lu | |
| 2015/0185349 A1 | 7/2015 | Martinez | |
| 2015/0253444 A1 | 9/2015 | Hu | |
| 2017/0023688 A1 * | 1/2017 | Schneider, Jr. | G01V 1/306 |

OTHER PUBLICATIONS

Mahmoudian et al., "A review of angle domain common image gathers" CREWES Research Report—vol. 21 (2009) (Year: 2009).*

Xu et al., "3D angle gathers from reverse time migration," Geophysics, Society of Exploration Geophysicists vol. 76, No. 2, Mar. 1, 2011, 16 pages.

Cheng et al., "Azimuth-preserved local angle-domain prestack time migration in isotropic, vertical transversely isotropic and azimuthally anisotropic media," Geophysicists, Society of Exploration of Geophysicists, vol. 77, No. 2, Mar. 1, 2012, 15 pages.

Hu, "Integrated Prestack Depth Migration of VSP and OBS Data in Angle Domain," SEG San Antonio 2007 Annual Meeting, Apr. 22, 2015, 6 pages.

International Search Report and Written Opinion of the International Searching Authority issued in International Application No. PCT/US2017/057335 dated Jan. 24, 2018; 22 pages.

Koren, Zvi et al.; "Full-Azimuth Subsurface Angle Domain Wavefield Decomposition and Imaging Part 1: Directional and Reflection Image Gathers"; Society of Exploration Geophysics; Geophysicists, US, vol. 76, No. 1; Jan. 1, 2011; pp. S1-S13.

Ravve, Igor et al.; "Full-Azimuth Subsurface Angle Domain Wavefield Decomposition and Imaging: Part 2—Local Angle Domain"; Society of Exploration Geophysics; Geophysicists, US, vol. 76, No. 2; Mar. 1, 2011; pp. S51-S64.

Zhang, Yu et al.; "Angle Gathers from Reverse Time Migration"; The Leading Edge; Nov. 2010; pp. 1364-1371.

International Search Report and Written Opinion of the International Searching Authority issued in International Application No. PCT/US2015/025304 dated Aug. 14, 2015; 11 pages.

Examination Report issued in GCC Application No. 2015/29245 dated Jan. 11, 2018; 4 pages.

* cited by examiner

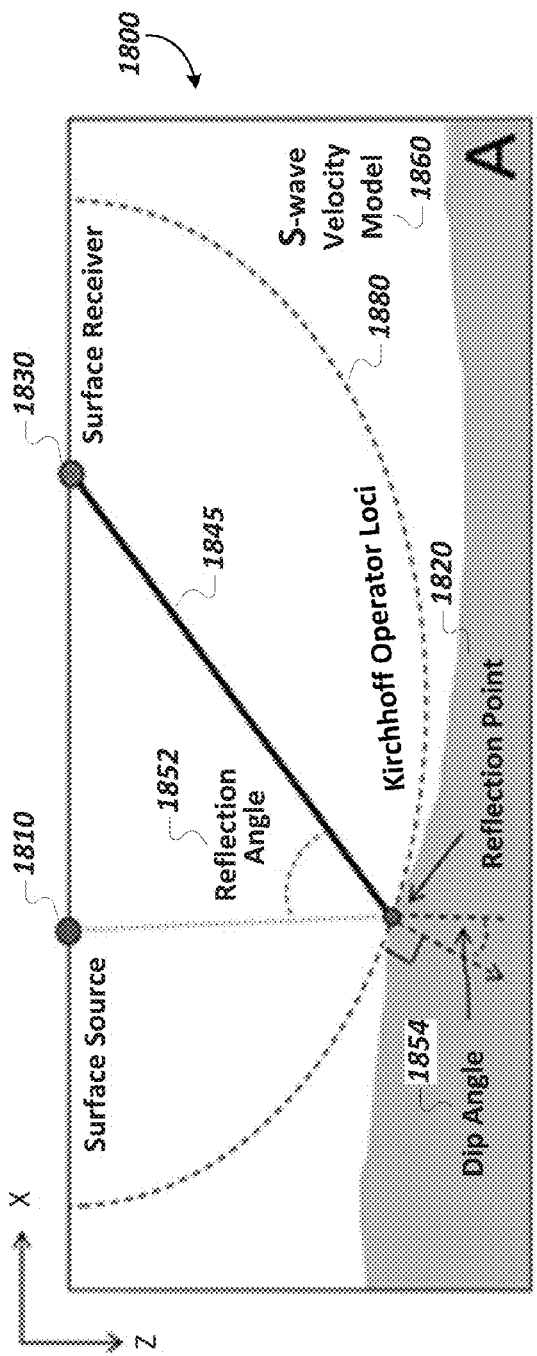
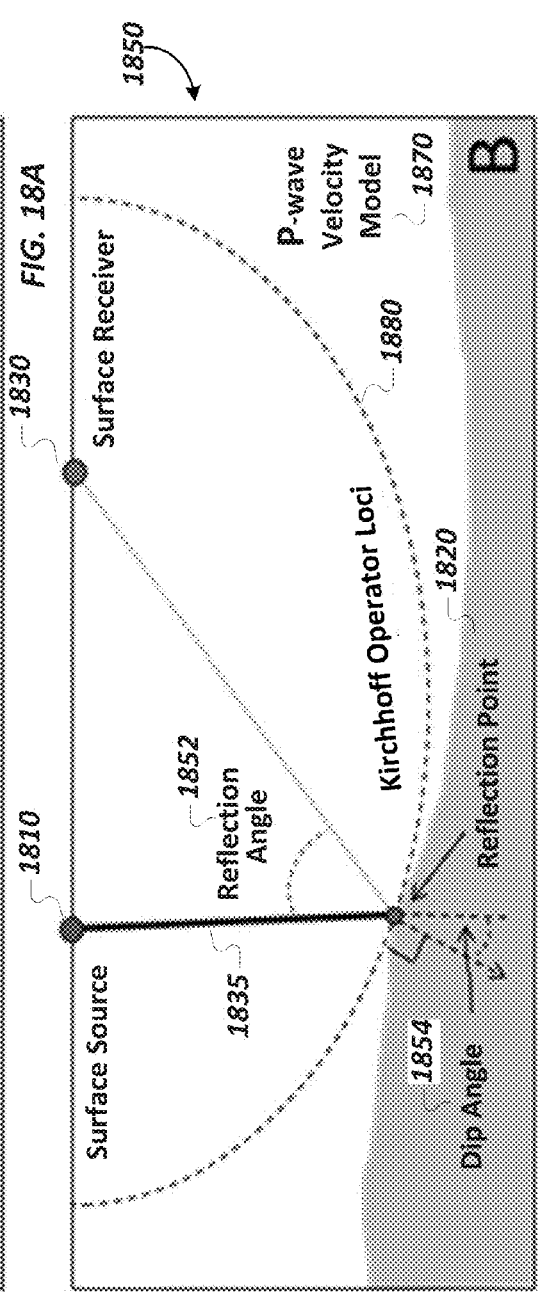
FIG. 18A
FIG. 18B

GENERATING SUBTERRANEAN IMAGING DATA BASED ON VERTICAL SEISMIC PROFILE DATA AND OCEAN BOTTOM SENSOR DATA

TECHNICAL FIELD

This disclosure relates to structure imaging and obtaining subsurface information for a subterranean region (e.g., a region from which hydrocarbons can be extracted) based on seismic data acquired in a borehole.

BACKGROUND

Seismic migration is a data-processing technique that creates an image of earth structure from the data recorded by a seismic reflection survey. Seismic migration geometrically relocates seismic events that are recorded in data in space and time to the location where the event occurred in the subsurface of the earth, thereby creating an image of the subsurface. Some example migration methods include, for example, zero-offset migration, pre-stack migration, finite difference migration. As an example, Pre-Stack Depth Migration (PSDM) is a migration method for high resolution imaging of seismic data acquired either from earth's surface or within single or multiple boreholes.

SUMMARY

This disclosure relates to structure imaging and obtaining subsurface information based on borehole seismic data acquired from 3D vertical seismic profiling (VSP) surveys for reservoir analysis of a subterranean region.

In general, example innovative aspects of the subject matter described here can be implemented as a computer-implemented method, implemented in a computer-readable media, and/or implemented in a computer system, for generating subterranean imaging data based on vertical seismic profile (VSP) data. VSP data of a subterranean region can be received and processed. Four angle attributes for each image point can be computed based on initial velocity models for the received VSP data. Five-dimensional (5D) angle-domain common-image gathers (ADCIG) can be generated according to a ray-equation method based on the four angle attributes. In some implementations, the ADCIG can be further analyzed for various applications by a comprehensive post-processing package.

This, and other aspects, can include one or more of the following features. The ray-equation method is implemented for the Kirchhoff integral method. In some instances, a multi-parameter Green's function can be computed based on ray-tracing in either depth or converted/stretched time domain. In some implementations, the ray-equation based Kirchhoff integral method for composite velocity model is used to image both free surface multiples and primary reflections of VSP data simultaneously. In some instances, ray parameters can be computed based on gradients of travel time fields computed based on a velocity model for the VSP data geometry, and the four angle attributes for each image point can be computed based on the ray parameters. The four angle attributes for each image point can include a reflection-angle, an azimuth-angle of each reflection-angle, a dip-angle of each reflection-azimuth angle pair, and an azimuth-angle of each dip-angle for each reflection-azimuth angle pair.

In some aspects, multi-parameter tables for the Green's function can be generated in separated files for multiple velocity models and Thomsen anisotropic parameters for imaging multi-component data. In some instances, travel time shadow zones can be infilled based on a ray-tracing algorithm. In some aspects, mode-converted energy PS-data can be migrated in a time domain to avoid depth-to-time conversion in a post-processing process. In some implementations, this helps update velocity model involving anisotropic effects using (1) vertical velocity, (2) horizontal velocity and (3) residual moveout function.

In some aspects, the generated ADCIG can be post-processed to enhance structure images and angle gathers for rock property inversion. Post-processing the generated ADCIG can include one or more of imaging down-going energies associated with the first order free surface-multiples, imaging up-going energies associated with primary reflections, or imaging multi-component data. The multi-component data can include one or more of PP-data, SS-data, or PS-data. In some instances, post-processing the generated ADCIG can include performing interpretation-based post-processing, based on one or more of the angle attributes from horizon picks from surface seismic data or reflection angles estimated from well-logs or ray-based modeling methods. The interpolated reflection and dip angle data derived from horizon picks, modeling, and well-logs are applied as a guide for extracting associated traces in ADCIG to produce continuous structural images for a series of reflection angles that are useful for rock property estimation.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

BRIEF DESCRIPTION OF THE DRAWINGS

The patent or application file contains at least one color drawing executed in color. Copies of this patent application publication with color drawing(s) will be provided by the Patent and Trademark Office upon request and payment of the necessary fee.

FIG. 18A is a diagram showing an example travel time table computed for a receiver for an S-wave velocity model for OBS PS data.

FIG. 18B is a diagram showing an example travel time table computed for a source for a P-wave velocity model for the OBS PS data.

Like reference numbers and designations in the various drawings indicate like elements.

DETAILED DESCRIPTION

Figure 1:
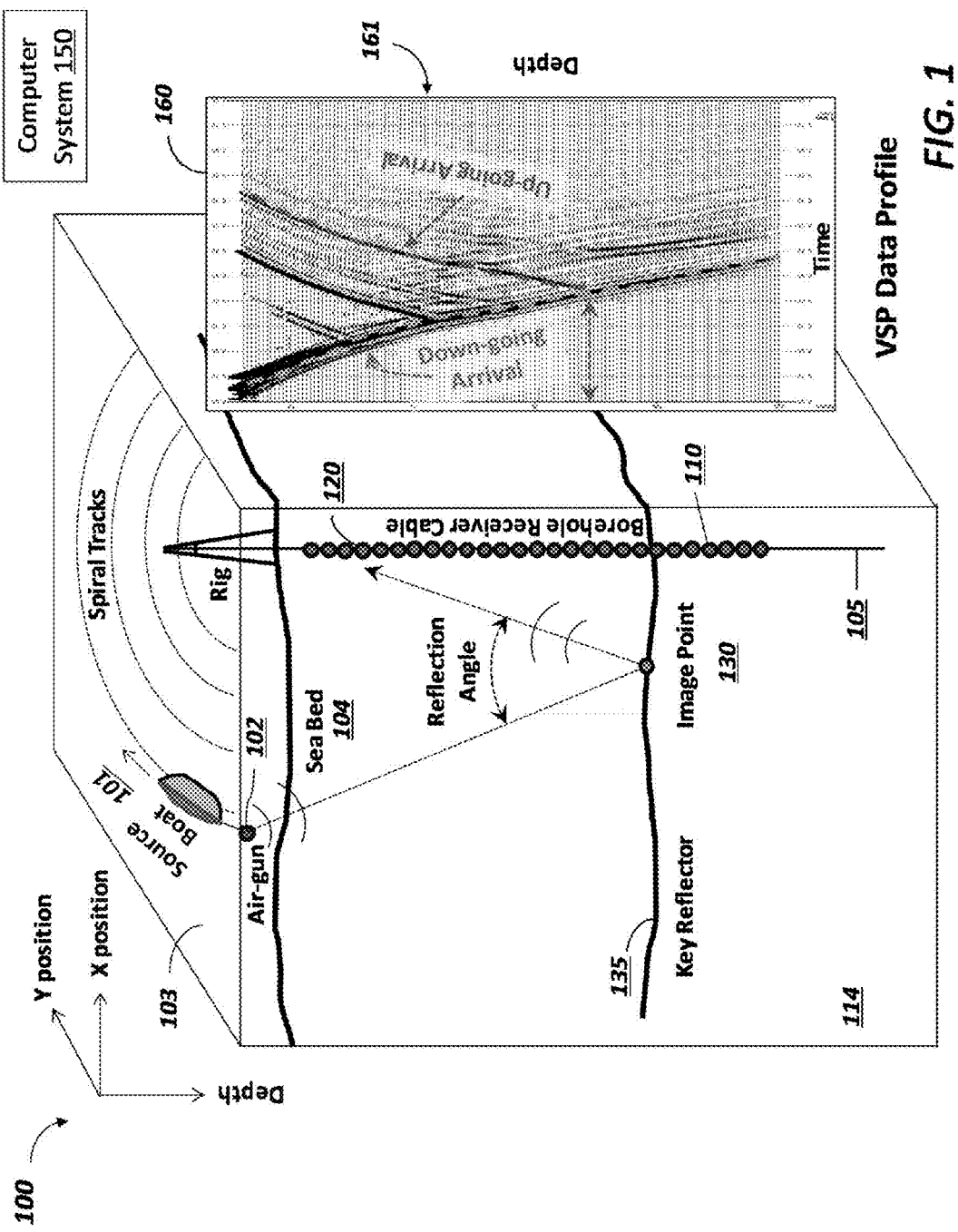
FIG. 1 is a diagram showing an example well survey system and a computer system for borehole seismic data.

This disclosure describes computer-implemented methods, software, and systems for generating angle-domain common-image gathers (ADCIG) from multi-component three-dimensional (3D) vertical seismic profile (VSP) data for structure imaging and to obtain subsurface information for reservoir analysis. For example, the structure imaging can be used to analyze location and geology of reservoirs that contain hydrocarbons and can be used to design a drilling process for placing wellbores in the earth to maximize oil or gas production. Unlike surface seismic data that results from a seismic wave source and a receiver that are both on the surface (e.g., sea surface or ground surface), the VSP data results from either a borehole source, a borehole receiver, or both. For example, the VSP data can be acquired in a borehole. By moving the receiver (e.g., geophones) down into a borehole away from shallow layers, the collected VSP data can avoid various near surface challenges encountered by surface seismic surveys and thus have less noisy, cleaner reflections (e.g., due to higher signal to noise (S/N) ratio).

Analysis of high resolution VSP data is more advantageous than surface seismic data. For example, for VSP data, wavelets for deconvolution and inversion can be extracted directly from the recorded waveform; anisotropy parameters can be estimated from the multi-component full azimuth data; and the average velocity above the borehole geophones can be measured directly. For improved subsurface structural imaging, wide azimuth and offset 3D VSP data can be collected by placing large numbers of surface shots around, and away from, the receiving borehole.

The example techniques described herein relate to generating ADCIG from the multi-component 3D VSP data and post-processing of ADCIG to enhance structure image. The ADCIG generation method can be based on Kirchhoff integral method. The ADCIG generation method can include computation of five-dimensional (5D) ADCIG at each image point and computation of Green's function based on ray-tracing. The multi-attribute angle gathers represent seismic images as function of (1) reflection-angle at each subsurface point, (2) corresponding azimuth-angle of each reflection-angle, (3) dip-angle of each reflection-azimuth angle pair, and (4) azimuth-angle of each dip-angle for each reflection-azimuth angle pair.

Generated ADCIG can be post-processed, for example, for enhancement of structure images, separation of images for up- and down-going waves for enhancing shallow reflections, imaging mode-converted data such as PS mode-converted energies for rock-property analysis with improved resolution, improving irregular subsurface illumination, target-oriented structure enhancements, or other applications. Example post-processing techniques of ADCIG can be based on horizon picks from surface seismic data, reflection angles estimated from well-logs and ray-based modeling methods, or other information and techniques.

In some implementations, the techniques described herein allow detailed processing of the VSP data and can affect exploration and drilling decisions, if needed. The techniques can help obtain high resolution structure images and estimated elastic parameters, and, in turn, help optimize the placement of horizontal wells to maximize recovery and minimize the drilling of dry holes. For instance, the techniques described herein can help delineation of stringer sands in offshore reservoir fields and support horizontal drilling projects by providing not only high resolution images but also angle attributes for quantitative reservoir analysis. Additionally, the techniques can be applied to image faults and major fracture systems near boreholes with spatial resolution that cannot be easily obtained via the surface seismic measurements. Moreover, the techniques can be applied for imaging salt-flanks and subsalt sediments with either single or multiple borehole measurements for either borehole source or surface source configurations.

FIG. 1 is a diagram showing an example well survey system 100 and a computer system 150. The example well survey system 100 and computer system 150 can be used to acquire 3D VSP data. In the illustrated example, the well survey system 100 is located offshore, over a sea bed 104, for acquiring marine 3D VSP data. A well survey system can also be implemented on land or in another subterranean region.

The computer system 150 can include one or more computing devices or systems. The computer system 150 or any of its components can be located apart from the other components shown in FIG. 1. For example, the computer system 150 can be located at a data processing center, a computing facility, or another suitable location. The well survey system 100 can include additional or different features, and the features of the well survey system can be arranged as shown in FIG. 1 or in another configuration.

The example well survey system 100 includes a source vehicle 101 (e.g., a boat) carrying navigation equipment and an energy source 102 (e.g., a seismic air-gun). A borehole 105 is drilled through the sea bed 104 beneath the sea surface 103. Multiple receivers 120, e.g., geophones, are assembled in a wire-line cable 110, deployed in the borehole 105. The example borehole 105 shown in FIG. 1 includes a vertical borehole. However, a well survey system may include any combination of horizontal, vertical, slant, curved, or other borehole orientations. The well survey system 100 can include additional or different components.

By firing the air-gun energy beneath the ocean surface 103, acoustic waves can travel through solid earth 114, be reflected by a seismic reflector (also known as, a reflection point or an image point) 130 from layer boundaries 135, and recorded by borehole receivers 120. The subplot 161 of FIG. 1 illustrates example recorded VSP data 160 that shows both down-going and up-going energies that can be imaged in angle domain, using the reflection-angle attribute. In some implementations, the VSP data 160 can be acquired in various depth levels along the borehole 105. In general, seismic reflectors near the borehole 105 are illuminated with fewer angles than those reflectors with far source offsets.

Compared with surface seismic data recorded based on seismic waves originated from a source and a receiver that are both located on the surface (e.g., sea surface 103 or a ground surface), VSP data can have less noise and higher fidelity, and can be analyzed for reservoir properties via imaging, modeling, and inversion for various seismic attributes. In some implementations, unlike the surface seismic data migration, VSP geometry requires the VSP data 160 to be migrated with wide angle attributes. The angle attributes can include, for example, (1) reflection angle with values (min, max)=(0°~90°), (2) reflection azimuth angle with values (min, max)=(0°~360°), (3) absolute dip angle with values (min, max)=(0°~180°) and (4) dip azimuth angle with values (min, max)=(0°~360°).

Figure 2:
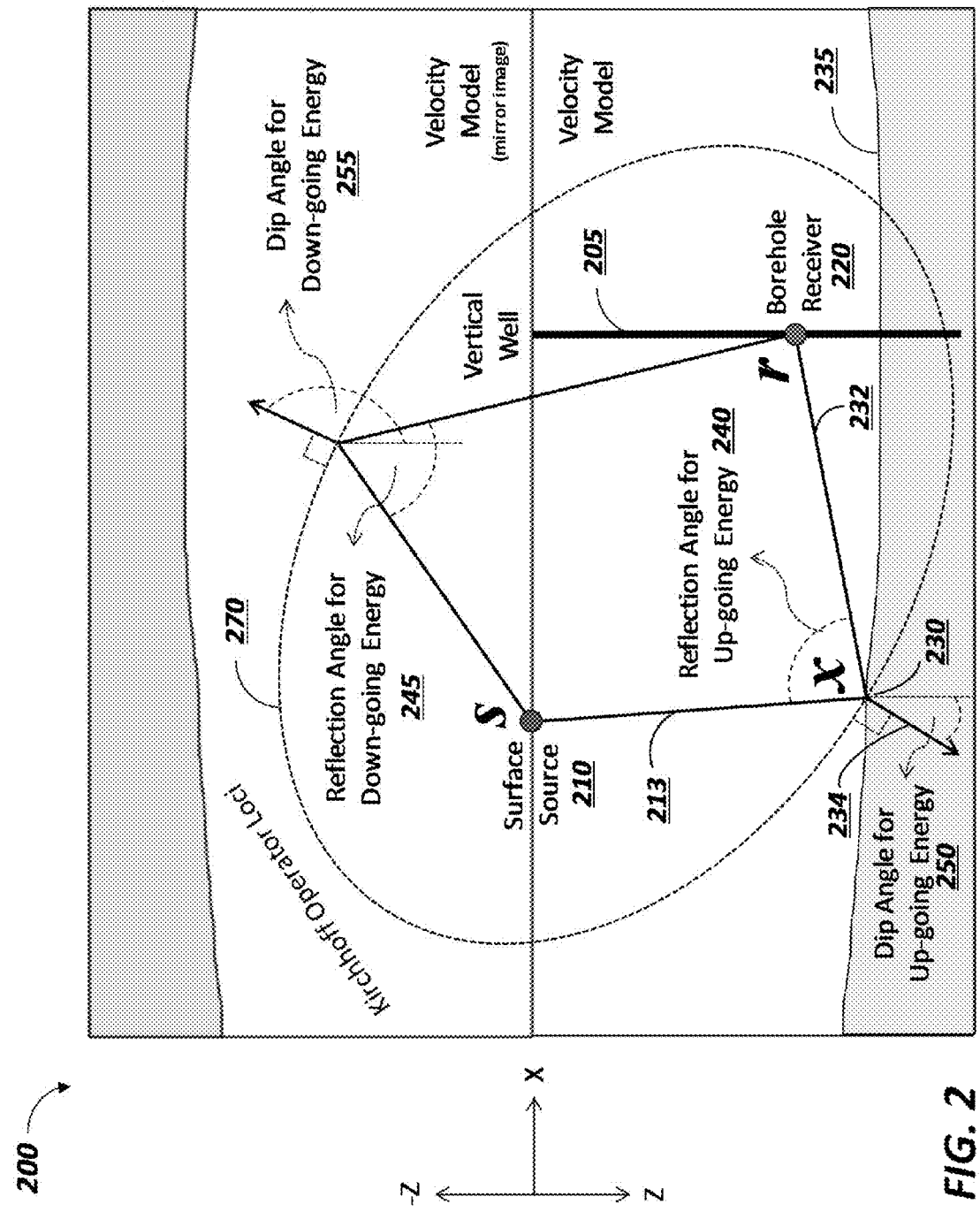
FIG. 2 is a diagram showing example angle attributes of the VSP data.

FIG. 2 is a diagram 200 showing example definitions of angle attributes of the VSP data. FIG. 2 shows a surface source (s) 210, a receiver (r) 220 located in a borehole 205, and a reflector or image point (x) 230. In some implementations, the surface source 210, the borehole receiver 220, and the image point 230 can represent the source vehicle 101 including the energy source 102, the borehole receiver 120, and the reflector 130 from layer boundaries 135, respectively. The surface source 210, the borehole receiver 220, and the image point 230 can represent other sources, receivers, and reflectors in other implementations.

The locations of the surface source 210 and borehole receiver 220 can be represented by (Xs, Xr). The travel time from the surface source 210 to the borehole receiver 220 can be represented by t. Unlike wave-equation methods (e.g., Reverse Time Migration method), the Kirchhoff-integral method is a ray-equation method. The Kirchhoff migration algorithm can include two main steps: (1) to compute travel time tables (i.e., Green's function g(x, t) in Equation (1)) for all source and receiver positions (Xs, Xr) with ray-tracing and (2) to distribute amplitudes of input seismic data D(Xs, Xr, t) along the total travel time trajectories as defined in step 1, and then accumulate these for every image points I(x) in the subsurface as shown in Equation (1). The function W(x,t) is for amplitude compensation.

$$I(x)=\Sigma_{X_s}\Sigma_{X_r}W(x,t)D(X_s,X_r,t)g[t(X_s,x)+t(X_r,x)] \quad (1)$$

In some instances the total travel time trajectory is an elliptical function (e.g., shown as an ellipse 270 in FIG. 2) whenever the medium velocity is constant; however, it may have an irregular shape when encountering complex velocity media.

FIG. 2 shows an incident ray 213 from the surface source 210 to the reflector 230, and a reflection ray 232 from the reflector 230 to the borehole receiver 220. The geometry of the seismic waves can define the angle attributes of the VSP data. For example, a reflection angle 240 can be defined as the opening angle between the incident ray 213 and the reflection ray 232. A dip angle 250 can be defined as the angle between the vertical depth direction (i.e., the z-axis) and the normal 234 to the elliptical surface 270 at the image point 230. In some implementations, extension of the dip angle that is beyond 90° enables free surface multiples (i.e., down-going energy) to be migrated together with the up-going reflections by using different dip-angle ranges of the same operator. For example, FIG. 2 shows a reflection angle 245 and a dip angle 255 (higher than 90°) for down-going energy; while, the reflection angle 240 and the dip angle 250 (lower than 90°) is shown for the up-going energy. Such full dip-angular coverage enables both free surface multiples and primary reflection to be imaged simultaneously.

In some implementations, the angle attributes can be derived based on ray-parameters directly from the ray-path. Alternatively, ray-parameters can be estimated from the gradient of travel time fields. In some instances, full wave fronts/rays fields can be traced from the surface (e.g., the reflection layer 235) for every subsurface image point and interpolated for every source and receiver pairs, via interpolation. Additional or different techniques can be used to calculate the angle attributes from the subsurface image point up to surface as a buried diffractor; however, such technique can be more costly than the current method.

Figure 3:
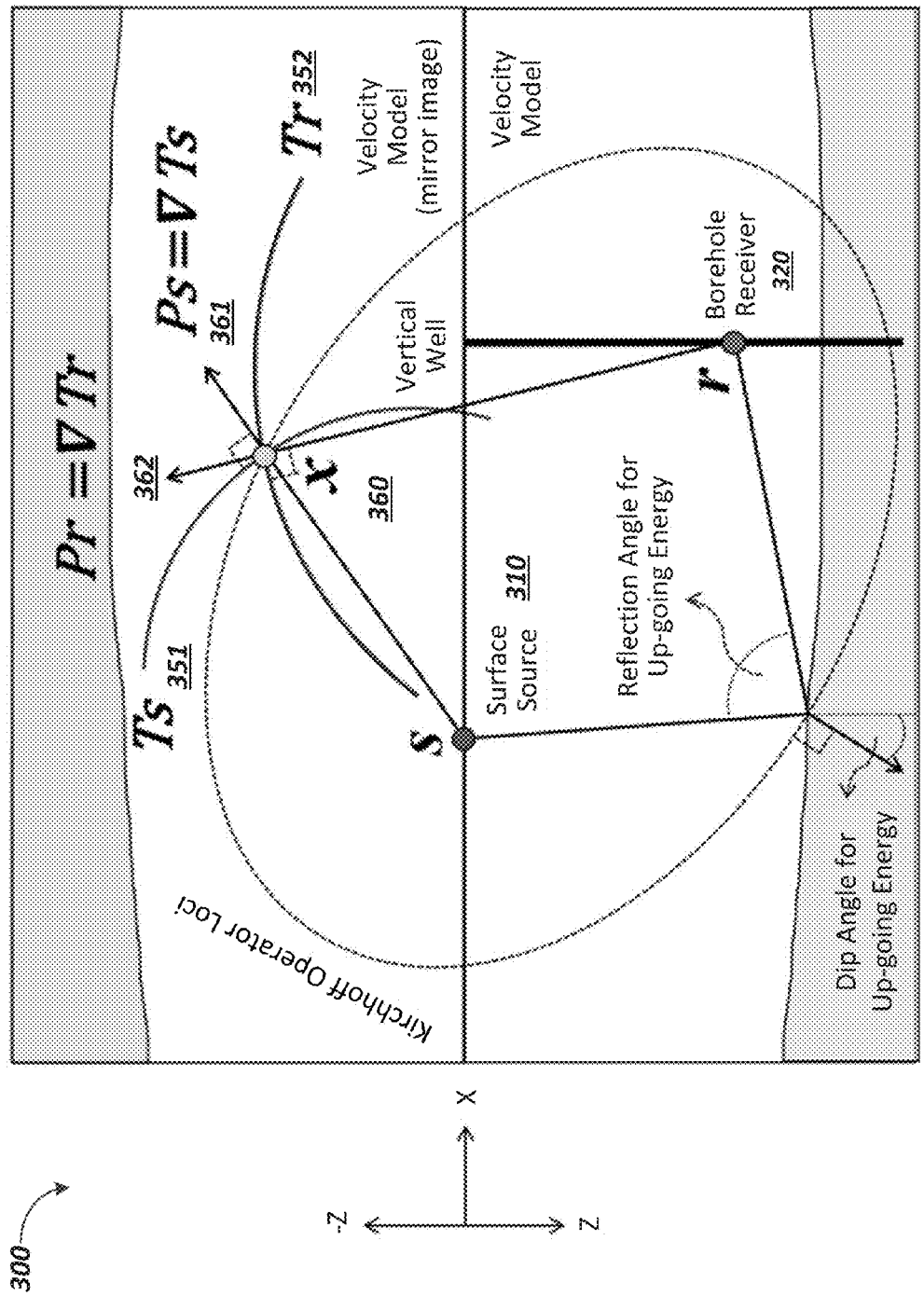
FIG. 3 is a diagram showing an example method of computing opening angles with ray parameters that are estimated with the gradient of travel time fields.

FIG. 3 is a diagram 300 showing example method of computing reflection angles (or opening angles) with ray parameters that are estimated with the travel time fields for a source and a receiver, respectively. For example, the unit vector (ray parameter) Ps from a source (s) 310 to a mirror image point (x) 360 can be obtained from the gradient of a source travel time Ts 351 at position (x) 360 as Ps=∇Ts. The unit vector (ray parameter) Pr from a receiver (r) 320 to the same mirror image point (x) 360 can be obtained from the gradient of a receiver travel time Tr 352 at position (x) 360 as Pr=∇Tr. Applying the inner product rule between these two vectors, Ps 361 and Pr 362, the reflection angle 360 can be derived.

Figure 4:
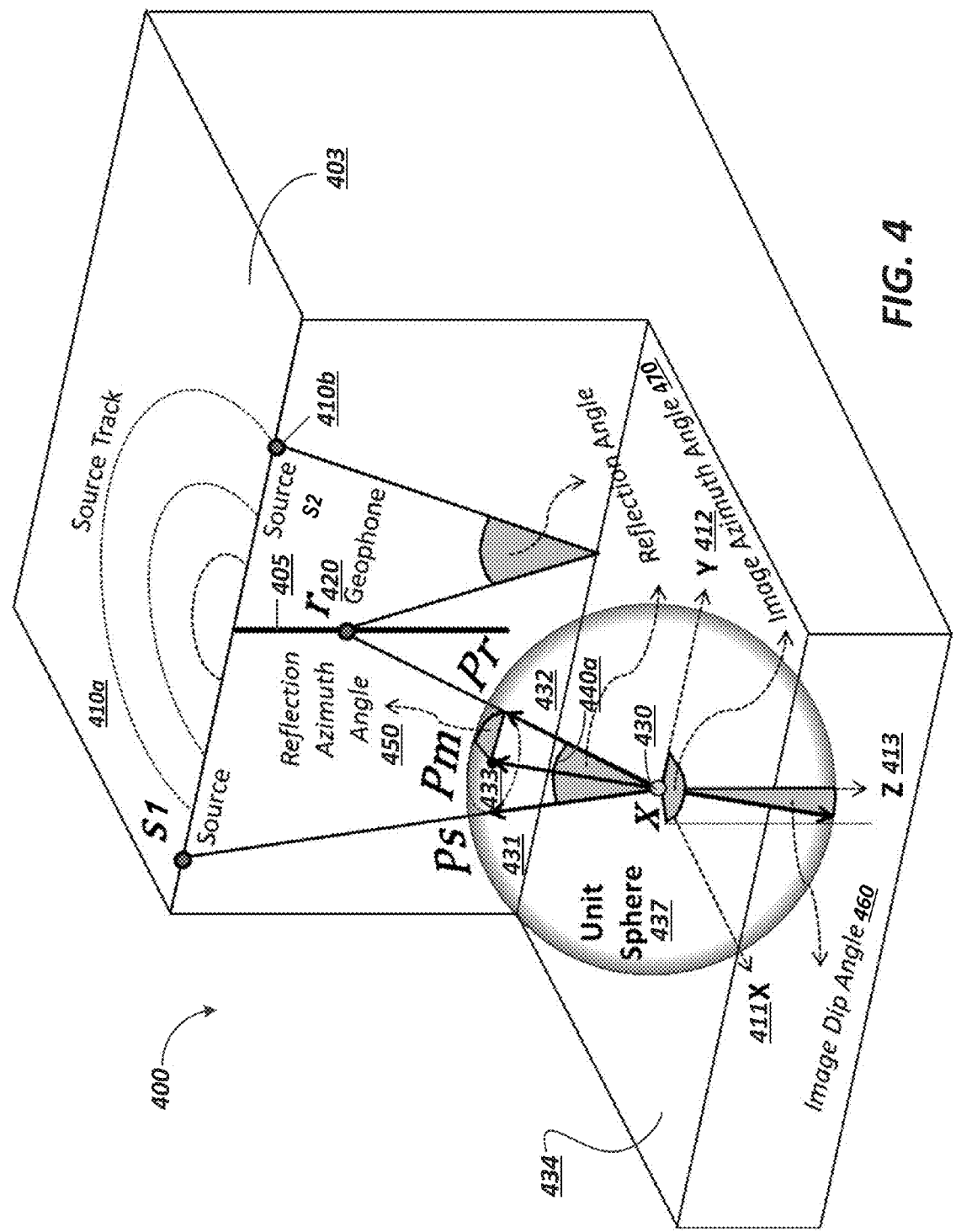
FIG. 4 is a diagram showing example angle attributes for the VSP data.

FIG. 4 is a diagram 400 showing example angle attributes for the up-going only VSP data in a 3D perspective. The example angle attributes for the down-going VSP data in the 3D perspective are not illustrated; however, these should be similar to FIG. 2, except their angular coverages in the negative depth space above the surface are different than those in the positive depth space. As illustrated, FIG. 4 includes two sources (S1) 410a and (S2) 410b and a downhole geophone receiver (r) 420 located in a borehole 405. The two sources (S1) 410a and (S2) 410b are located on a surface 403 (e.g., the sea surface 103 in FIG. 1, a ground surface, etc.) and emit energy beneath the surface 403. FIG. 4 shows an image point (X) 430 located on a reflection layer 434 and a unit sphere 437 centered at the image point (X) 430. Ray parameter Ps 431 is the unit vector at the image point (X) 430 directing to the surface source (S1) 410a, and ray parameter Pr 432 is a unit vector directing to the borehole receiver (r) 420. The two ray parameters Ps 431 and Pr 432 can be derived, for example, based on the gradient of two travel time fields as described with respect to FIG. 3.

The angle attributes of the image point (X) 430 include a reflection angle 2θ 440a, an azimuth angle 450 of the reflection-angle 440a, a dip-angle 460, and an azimuth-angle 470 of the dip-angle 460; all four angles are shown in shaded areas in FIG. 4. The angle attributes can be defined and obtained, for example, based on the obtained ray parameters Ps 431 and Pr 432 and the coordinates (x,y,z) of the image point (X) 430. Here the z-axis 413 is the vertical or depth axis and x-axis 411 and y-axis 412 are two orthogonal horizontal axes spanning in the surface 403. In some implementations, the y-axis 412 can be the inline direction while the x-axis 411 can be the cross-line (x-line) direction, or vice versa, or any other appropriate directions.

The reflection angle 2θ 440a can be defined as the opening angle between the source ray parameter Ps 431 and the receiver ray parameter Pr 432. For instance, the reflection angle 2θ 440a can be obtained based on the inner product of ray parameters Ps 431 and Pr 432 according to Equation (2). Equation (3) defines a midpoint ray parameter Pm 433 that is the unit vector of the vector sum Ps+Pr. The azimuth angle α 450 of the reflection-angle 440a can be defined as the angle formed by two normal vectors. One normal vector is normal to the plan spanned by ray parameters Ps 431 and Pr 432; while the other normal vector is normal to the midpoint ray parameter Pm 433 and the y-axis 412 (e.g., the inline axis). As an example, the azimuth angle α 450 of the reflection-angle 2θ 440a can be obtained based on the inner-product of the cross-product vector (Pr×Ps) and the cross-product vector (Pm×y), according to Equation (4). The dip-angle ϕ 460 can be defined as the angle formed by the depth direction (i.e., z-axis) and the midpoint ray parameter Pm 433, and can be obtained based on the inner product of Pm 433 and z-axis 413 according to Equation (5). The azimuth-angle β 470 of the dip-angle ϕ 460 can be defined as the angle formed by the y-axis 412 with the unit normal vector to the plane spanned by the z-axis 413 and the midpoint ray parameter Pm 433. The azimuth-angle β 470 can be obtained based on the inner and cross-product rules, according to Equation (6). In some other implementations, additional or different techniques can be used to compute the angle attributes of the VSP data.

With the four angle attributes, the VSP image can be organized in a five-dimensional (5D) space with axes of (reflection, reflection-azimuth, dip, dip-azimuth, depth). For instance, a five-dimensional data cube (θ, α, ϕ, β, z) for the image point (x) 430 can be obtained based on Equations (2)-(6). The ADCIG can contain a group of imaged seismic traces at each (x, y, z) location, showing reflection amplitudes as function of the four angle attributes.

$$\cos(2\theta) = \frac{Ps \cdot Pr}{|Ps||Pr|}, \quad (2)$$

$$Pm = \frac{Ps + Pr}{|Ps + Pr|}, \quad (3)$$

$$\cos(\alpha) = \frac{(Pm \times y) \cdot (Pr \times Ps)}{|Pm \times y||Pr \times Ps|}, \quad (4)$$

$$\cos(\phi) = \frac{Pm \cdot z}{|Pm||z|}, \quad (5)$$

$$\cos(\beta) = \frac{(z \times Pm) \cdot y}{|z \times Pm||y|}. \quad (6)$$

Figure 5:
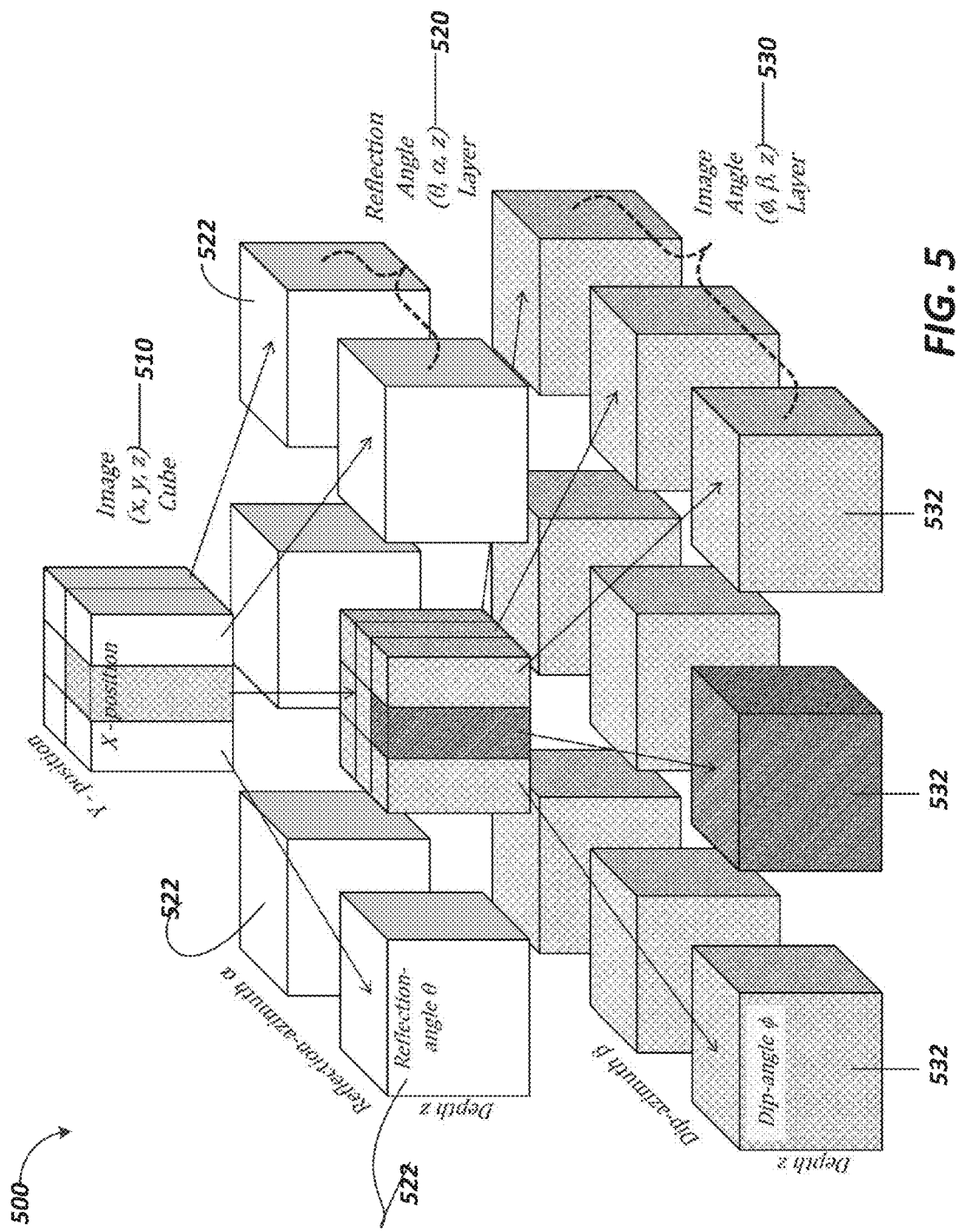
FIG. 5 is a diagram showing example data hierarchy of angle-domain common-image gathers (ADCIG) cubes for imaging VSP data.

FIG. 5 is a diagram showing example data hierarchy 500 of ADCIG cubes to store the VSP image. The data hierarchy 500 of ADCIG starts with a top layer 510 of the output image (x, y, z) cube. For each (x, y) position, there is a corresponding (θ, α, z) volume 522 in the middle layer 520 to represent reflection angle θ and reflection-azimuth angle α for every depth sample. Then, for each (θ, α) angle pair (or an index-pointer) of each volume 522, there is a corresponding (ϕ, β, z) volume 532 in the lower layer 530 to represent dip angle ϕ and dip-azimuth angle β for every depth sample. The five-dimensional data cube (θ, α, ϕ, β, z) can be arranged in another manner, depending on post-processing applications or other criteria, for various applications. For imaging VSP data, as the dip angle plays an important role for up and down-going energy, it can be fully preserved (0°~180°) and analyzed.

Figure 6:
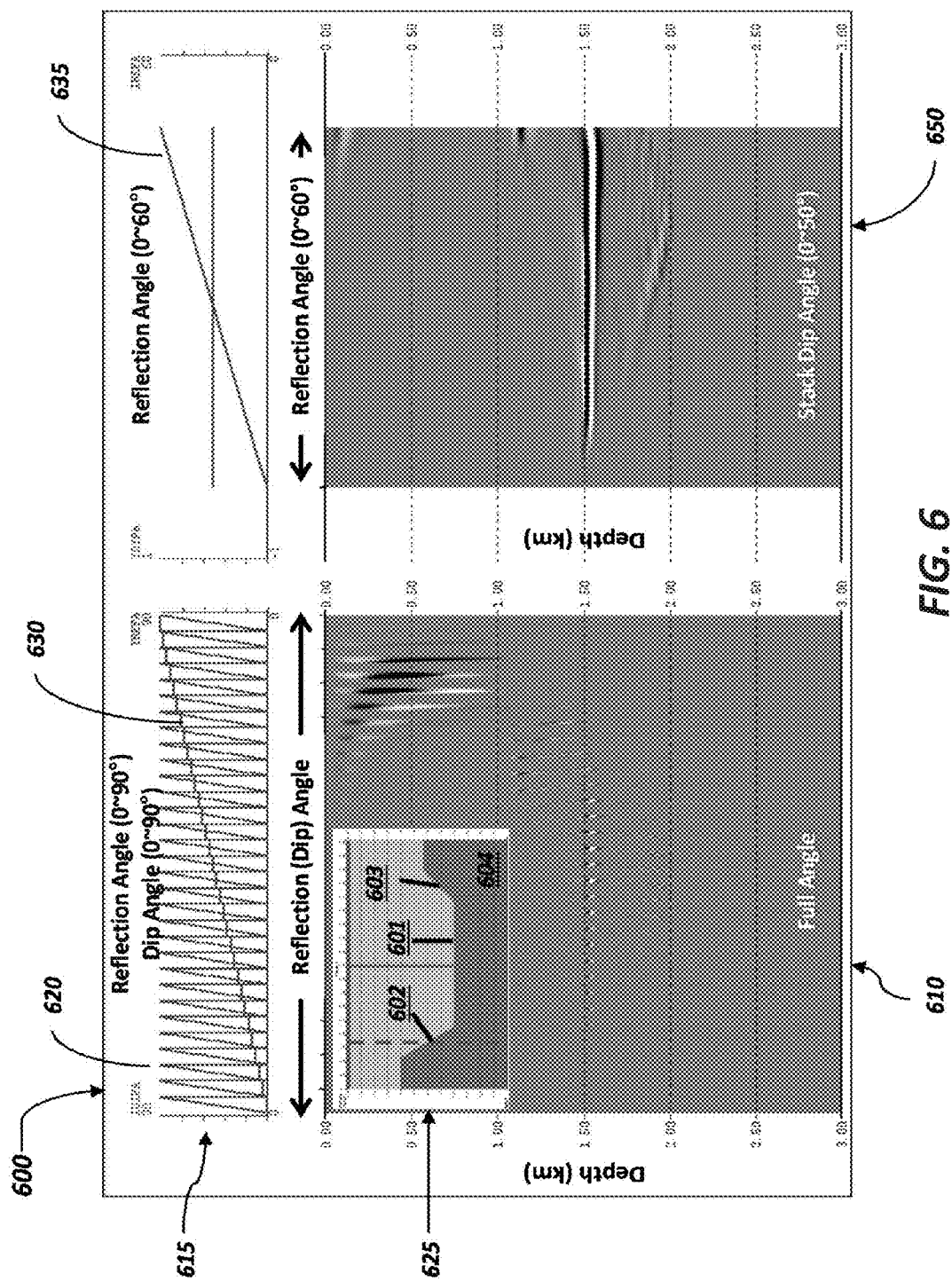
FIG. 6 is a plot including plots showing example full ADCIG and processed ADCIG for a synthetic VSP data, respectively.

FIG. 6 is a plot 600 including plots 610 and 650 showing example full ADCIG and processed ADCIG, respectively, based on synthetic VSP data of a velocity model 625. The example synthetic model 625 includes a single reflector 601 with two reversed dips 602 and 603 overlaid a high velocity lower layer 604. Plot 610 shows the full ADCIG images obtained by the Kirchhoff integral method for synthetic VSP data, with dip-angles and the reflection angles ranging from 0° to 90°, respectively. The subplot 615 above the full ADCIG image 610 shows a chain-saw curve 620 representing the dip angles and a stair-stepping line 630 representing the reflection angles for corresponding traces of the ADCIG. In the illustrated example, the dip angles vary more rapidly than the reflection angles. Plot 650 shows the processed ADCIG image that is obtained by stacking (e.g., summing) dip-angles ranging between 0° and 50° for reflection angles ranging between 0° and 60°. To reduce edge effects, dip-angle traces are weighted with a windowing function before stacking (also referred to as a diversity stack method). The subplot 615 above the partially stacked ADCIG image 650 shows a line 635 representing the reflection angles that ranges from 0° to 60°. The partially-stacked reflection-angle gathers can be used, for example, to estimate rock property information.

Figure 7:
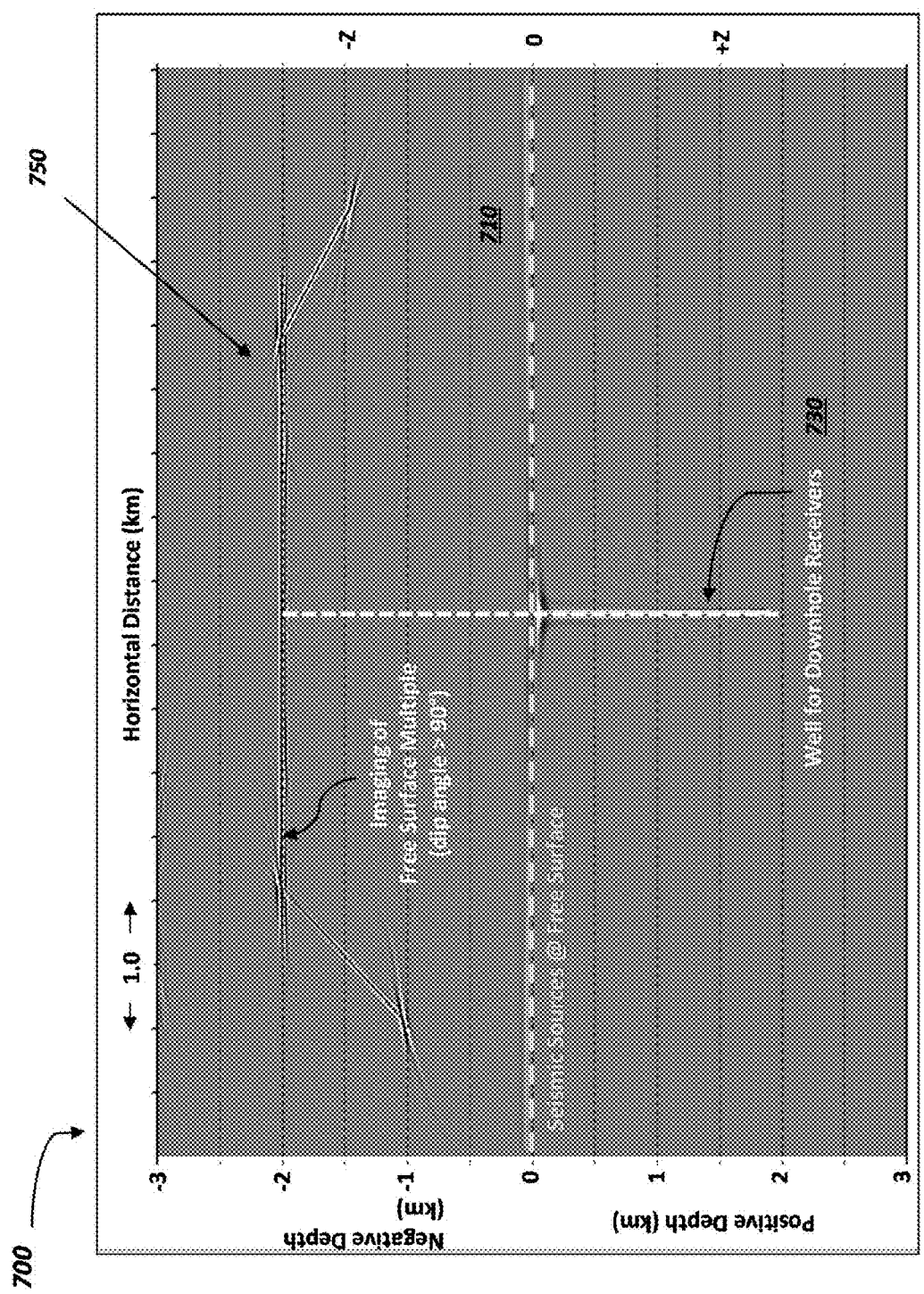
FIG. 7 is a plot showing an example of stacking high dip-angles to produce structure images associated with free surface multiples as down-going waves.
Figure 8:
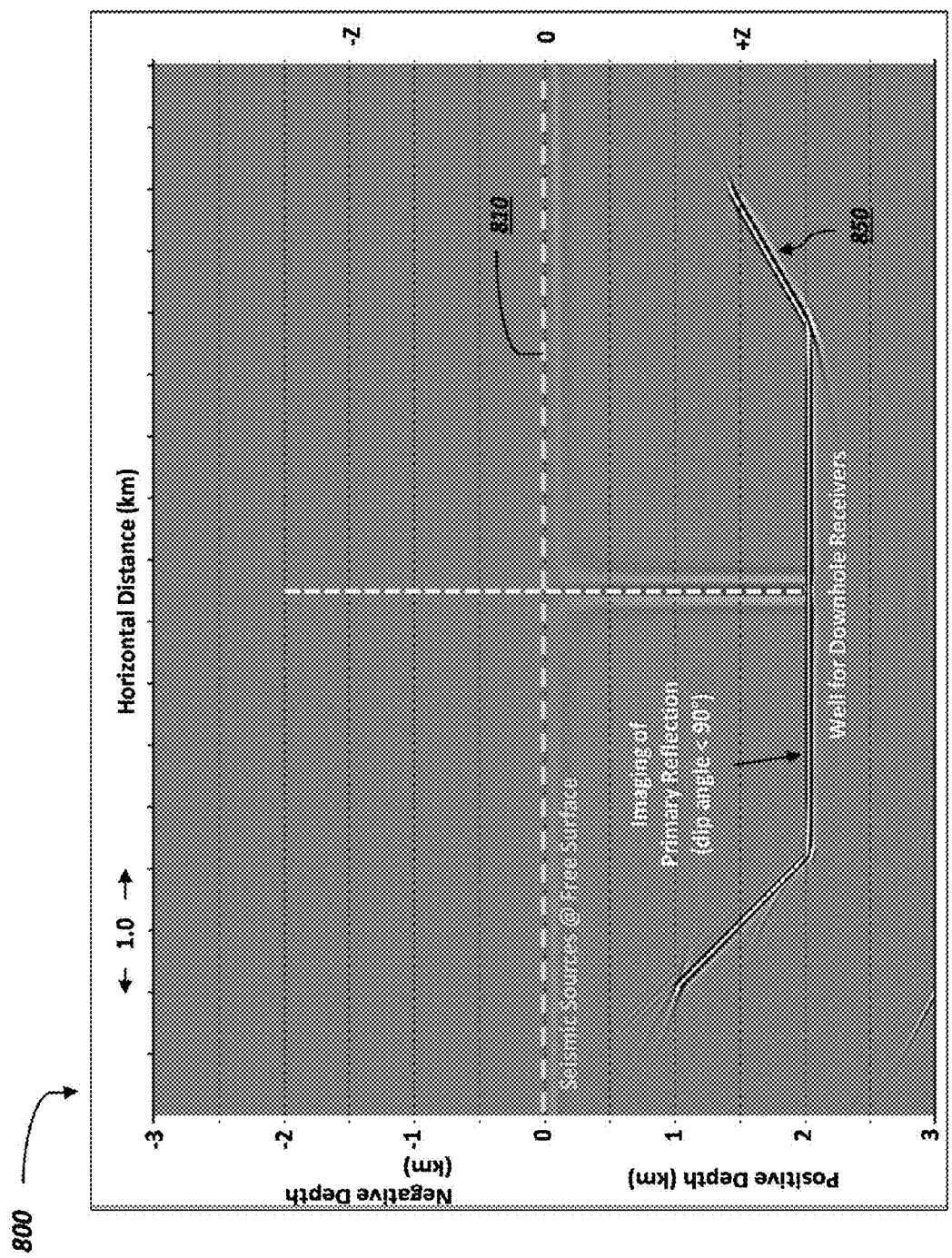
FIG. 8 is a plot showing an example of stacking low dip-angles to produce structure images associated with primary reflections as up-going waves.

Another example application of post-processing of ADCIG is selecting desired dip-angle ranges to produce images associated with down-going energies and up-going energies. FIG. 7 is a plot 700 showing an example of stacking high dip-angles (120°~180°) to produce structure images 750 associated with down-going waves (i.e., free surface multiples of VSP data). The well for downhole receivers is shown as 730. FIG. 8 is a plot 800 showing an example of stacking low dip-angles (0°~60°) to produce structure images 850 associated with up-going waves (i.e., primary reflections).

In some instances, the "mirror" images 750, produced above the free surface 710, are mainly contributed from the free surface multiples that can widen the illumination zone of the shallower reflections, and can be constructively stacked with a polarity reversal of the up-going images 850, as shown in FIG. 8, to increase the angular coverage of the total image beneath free surface 810. Thus, both up- and down-going VSP data can be used for imaging simultaneously and the conventional up-down separation of VSP data during a preprocessing effort is no longer required.

In some implementations, to implement the Kirchhoff integral method for migration, the multi-parameter Green's function can be pre-computed and stored in tables for migration. In some instances, the multi-parameter tables of the Green's function can be produced or computed based on a dynamic ray-tracing algorithm. For each source or receiver position, the dynamic ray-tracing algorithm can calculate both travel time and amplitude information along multiple ray-paths being traced from that initial position throughout a 3D isotropic and/or anisotropic velocity model. The dynamic information at each image point of the 3D space can be obtained by interpolation among multiple ray-paths and stored in a multi-dimensional data tables. The interval or instantaneous velocity model can be an isotropy or anisotropy model or another kind of velocity model in the depth domain. In some implementations, since VSP geometry may require placing a buried source in various depth positions, ray-tracing may need to be computed with full 360° azimuth and 180° dip angles directions for both up and down-going components, simultaneously, without any termination criteria.

In some implementations, the multi-parameter tables of the Green's function can include three main attributes: (1) travel time, (2) amplitude, and (3) total turns of 90° phase-rotation for each subsurface location. The Green's function G(x, y, z, Time+Amplitude+Phase) can be selected based on a maximum-amplitude criterion. For example, there can be multiple ray paths that arrive at a same image point location (x,y,z) with attributes such as (1) travel times, (2) relative amplitudes (e.g., in percentage of initial source strength), and (3) phase rotations of all arrivals. The maximum-amplitude criterion can only select the attribute associated with the maximum amplitude (or energy) at the subsurface location for subsequent computation.

In some implementations, for the ease of imaging multi-component VSP data as PP, SS, and PS-data, the multi-parameter tables of the Green's function can be stored in different files, to differentiate which velocity model type is used for ray-tracing. For example, PS means that the incident seismic wave from the source to the image point is P-wave (compressional wave), and it reflects as an S-wave (shear wave). Different velocity models can be used for the P-wave and S-wave. Accordingly, to image the PS-data, the multi-parameter tables for the source S can be stored in File-1 for the P-wave velocity model, while the multi-parameter tables for the receiver R can be stored in File-2 for the S-wave velocity model. On the other hand, PP means that the incident seismic wave is a P-wave, and it reflects as a P-wave; SS means that the incident seismic wave is an S-wave, and it reflects as an S-wave. To image PP-data or SS-data, the same table file can be used between the source S and the receiver R.

In some implementations, mode-converted energy PS-data can be migrated in a time domain for VSP geometry to avoid depth-to-time conversion in the post-processing. For example, the multi-attribute tables of the Green's function can be converted from depth to a vertical time (TAU) axis to allow ADCIG data to be imaged in the time domain directly. This conversion can be important to bypass the post-processing of PS-ADCIG, since it is very difficult to stretch depth to time by scaling only the S-wave velocity model alone. Equation (7) shows the relation between tau (τ) and depth (z), where a TAU at every depth sample can be obtained by accumulating contributions from finer depth increment dξ through a vertical velocity function $V_v(\xi)$ $$\tau(z) = \int_0^z \frac{2}{V_v(\zeta)} d\zeta. \tag{7}$$

In some instances, since angle attributes are directly computed from gradients of the travel time field, any void travel time areas (the shadow zones) may fail to contribute input data to the output ADCIG and yield low quality images. To infill travel time shadow zones, several example methods can be used. For example, (1) applying a two-point ray-tracing algorithm between all samples in the shadow zones and the corresponding source or receiver position, (2) applying the Eikonal equation to compute the full travel time table again, and substituting null values with the Eikonal solution, or (3) applying dynamic ray-tracing from every sample of the shadow zones until the shadow zones are fully in-filled. The (1) two-point ray-tracing algorithm and (3) dynamic ray-tracing algorithm are example ray-equation methods for infilling null Green's function tables. In some implementations, additional or different techniques can be used to handle the shadow zones.

Figure 9:
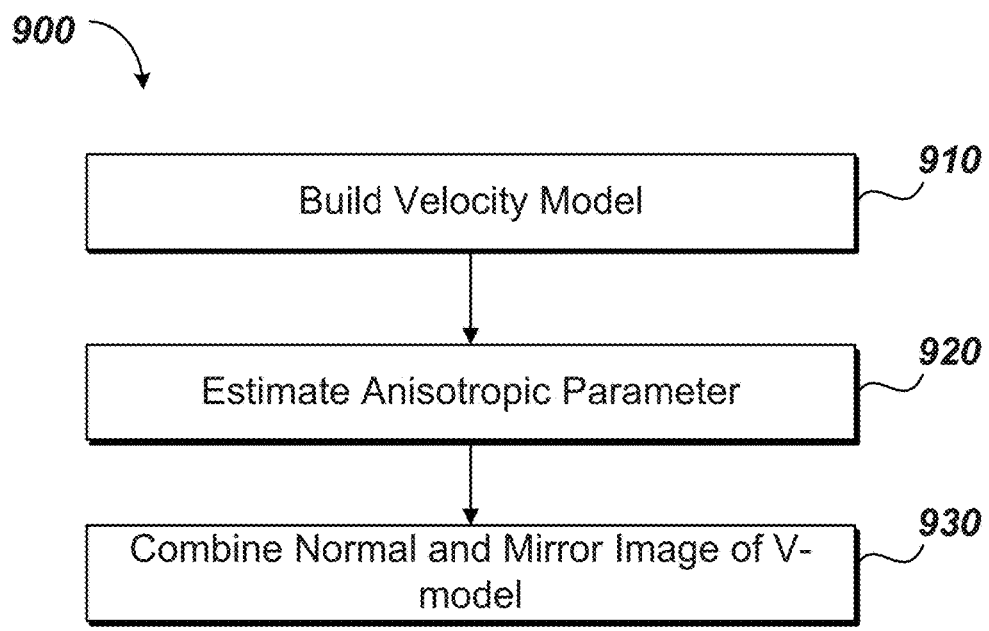
FIG. 9 is a flow chart showing an example method for merging normal velocity model and its mirror-image component into a single volume for composite imaging of free surface multiples and primary reflections.

In some implementations, for composite imaging of down- and up-going reflections, the normal velocity model (e.g., for the up-going reflections) and its mirror-image components (e.g., for the down-going reflections) can be merged into a single volume as v(x, y, −z+z). In some implementations, the four angle attributes for each image point can be computed using a composite velocity model to image the received VSP data containing both up and down-going waves. For instance, FIG. 9 is a flow chart showing example process 900 for merging the normal velocity model and its mirror-image component into a single volume. The process 900 can be implemented, for example, as computer instructions stored on computer-readable media and executable by data processing apparatus (for example, one or more processor(s) of the computer system 150 in FIG. 1). At 910, a normal velocity model can be built or received at first. For example, the data processing apparatus can design, select, or otherwise build a velocity model by using the Dix equation to convert normal-moveout (NMO) velocity estimated from input data to an interval velocity model, or by using the interval velocities measured from well log devices. At 920, anisotropic parameters of the velocity model can be estimated. For example, the anisotropic parameters can include, for example, Thomsen's epsilon and delta parameters for P-wave VTI media. The data processing apparatus can estimate the anisotropic parameters, for example, based on non-hyperbolic NMO of input data or by focusing analysis in the image domain. At 930, the normal velocity model and its mirror-image components can be combined, for example, by duplicating the sample value at the regular depth level (Z) for the opposite depth level (−Z) of the composite axis.

Table 1 illustrates an example algorithm for computing a multi-parameter Green's function table, for example, to image multi-component (P, S, PS) data.

TABLE 1

Example algorithm for computing multi-parameter Green's function table

LOAD velocity model files (isotropy or anisotropy model)
BLEND normal velocity model with its mirror-image V(x, y, −z+z)
(option)

TABLE 1-continued

Example algorithm for computing multi-parameter Green's function table

LOOP over source and receiver (S,R) positions
    COMPUTE dynamic ray-tracing with full azimuth and dip angles
    SELECT multi-parameters G(T, Amp, Phz) related to maximum energy
    IF shadow zone exist
        OPTION-1: two-point ray tracing between null zones and (S, R) position
        OPTION-2: Eikonal solution from (S, R) position
        OPTION-3: dynamic ray tracing between null zones and (S, R) position
    REPLACE shadow zones with active values
    STRETCH table from depth to tau (option)
PRODUCE multi-attribute tables in two files for S and R, respectively In some implementations, the multi-parameter Green's function tables may be built with a coarser sampling interval (dx, dy, dz) for their complete storages in the computer memory that can then be retrieved more efficiently than to read from much slower devices such as hard disks. The coarser Green's function tables can be spatially re-interpolated for the finer image grid during the migration stage. Two example interpolation methods can be used: (1) tri-cubic spline and (2) tri-linear interpolation. Tri-cubic spline interpolation requires a total of 64 input data samples to produce one output sample, while a tri-linear scheme requires only 8 samples. To improve coherency of tri-linear interpolation, a median filter can be applied in a moving window fashion to reduce spatial variance of output angle-attribute values. In some implementations, additional or different interpolation methods can be used for spatial interpolation of Green's function.

In some implementations, parallel programming can be implemented to perform the Kirchhoff integral method since it is a compute-intensive algorithm. For example, total computing tasks can be distributed among multiple computer nodes (e.g., a cluster of computer nodes) for real data application.

TABLE 2

Example algorithm for generating ADCIG with Kirchhoff integral method (a single-computing-node version)

OPEN multi-parameter table files produced by ray-tracing
LOOP over every input data trace D(S, R, T)
    PRE-PROCESS trace (scaling, differentiation, filtering, etc.)
    LOAD multi-parameter tables G(x, y, z/τ, T+Amp+Phz) for (S, R) pair
    COMPUTE full angle attributes (4D angle attributes)
    APPLY median filter to angle attributes (option)
    LOOP over every image sample I(x, y, z/τ) within aperture with the 4D angle attributes
        RESAMPLE multi-parameter table
        COMPENSATE amplitude loss (option)
        APPLY anti-alias filter
        STACK input data amplitudes in ADCIG
        STACK hit-counts in ADCIG
    STACK ADCIG containing hit-counts
PRODUCE ADCIG containing hit-counts in disk file Table 2 shows an example Kirchhoff integral algorithm for generating ADCIG, using a single computing node. A single computing node can be a single processor of a computing system that includes one or more processors (e.g., the computer system 150 in FIG. 1). Since the file size of complete multi-parameter Green's function tables can far exceed the maximum memory size of a single computing node, spatial decomposition of these tables among multiple computing nodes may be necessary. For instance, the computing node can store one or more multi-parameter Green's function tables produced by ray-tracing, and thus produce partial ADCIG images, according to the example techniques described with respect to Table 1. The final ADCIG images are obtained by summing all partial images produced by all computing nodes. For each input data trace D(S, R, T) with a source location S, receiver location R and the travel time T, the computing node can pre-process the input data trace, for example, by scaling, differentiation, filtering, or otherwise processing the input data trace. Then the computing node can load multi-parameter tables G(x, y, z/τ, T+Amp+Phz) for a particular (S, R) pair, and compute the full angle attributes (e.g., a reflection angle, reflection-azimuth angle, dip angle and dip-azimuth angle), for example, according to Equations (2)-(6).

In some implementations, for every image sample I(x, y, z/τ) within the migration aperture with the 4D angle attributes, the computing node can resample the multi-parameter table G(x, y, z/τ, T+Amp+Phz). In some instances, these multi-parameter tables can be pre-computed independently with different spatial sampling (dx, dy, dz) intervals than those of ADCIG. Resampling can be applied to re-construct the multi-parameter tables to produce the ADCIG data. For example, the pre-computed multi-parameter table can have grid spacing (dx, dy, dz)=(100 m, 100 m, 20 m); and the resampled tables can have (dx, dy, dz)=(50 m, 50 m, 5 m) that is matched to the sampling of the ADCIG.

In some implementations, amplitude loss due to geometry spreading of the input data traces can be compensated. For example, for relatively-true amplitude migration, the computing node can use one or more amplitude and phase-rotation parameters of the Green's function table to compensate amplitude loss at each (x,y,z) location during migration. In addition, a hit-count attribute that registers the irregular illumination of the VSP geometry can be used to normalize amplitudes of ADCIG samples selected for stacking in post-processing. In some instances, normalization without angle control tends to boost amplitudes related to migration artifacts and operator aliasing. Use a median filter to stabilize the hit-count attributes before stacking is another option (e.g., as shown in Table 3).

In some implementations, anti-alias filtering can be applied, for example, for high resolution imaging. As an example, the computing node can use the derived dip-angle attribute to reduce frequency bandwidth of the migration operator at steeper dips by lowering the frequency contain of the input data for summation. Thus anti-alias filters can work as a dip filter, e.g., high dip angles reduce frequency content of data and lower dip angles retain full frequency bandwidth of input data for Kirchhoff summation. In this way, dipping reflections can be imaged constructively.

After looping over every image sample I(x, y, z or τ) within the migration aperture for the above operations, the computing node can stack all input data amplitudes in the ADCIG domain, for example, based on the Kichhoff summation as shown in Equation (1). Thus, unlike existing methods that produce seismic images either with single attributes (such as offset) or no attributes (such as stacked section), the ADCIG generated by the example algorithm in Table 2 can contain a group of imaged seismic traces at each (x, y, z) location showing reflection amplitudes as function of (1) opening angle, (2) opening-azimuth angle, (3) dip angle, and (4) dip-azimuth angle.

In some implementations, hit-counts of each image point can be stacked in the ADCIG domain. The hit-counts that reflect the total illumination fold of each image point can be preserved in output data. For example, the first half of the output trace can contain the amplitudes, while the second half can contain the hit-counts. The ADCIG containing hit-counts can be saved or otherwise output in a disk file or another file. The ADCIG containing hit-counts can be used, for example, to compensate the irregular illumination geometry of VSP data.

In some implementations, the generated ADCIG can be post-processed to enhance the structure image, separate images for up- and down-going waves for enhancing shallow reflections, image mode-converted data with improved resolution, or any other applications. In some implementations, the post-processing can be interpretation-based. For example, since VSP data are often acquired in the later stage of exploration for high resolution imaging of potential reservoirs, plenty of information obtained from surface seismic and well-logs is available and can be used to enhance the ADCIG. Helpful information can include, for example, (1) horizon picks from surface seismic data and (2) reflection angles estimated from well-logs and ray-based modeling methods.

Horizon-picks generated from structure interpretation can include multiple layer boundaries extracted from surface seismic data. To use the horizon-picks for post-processing ADCIG, these manually picked horizons Z(x, y) can be resampled to fill the image grid as continuous surfaces. For example, the horizon-picks can be vertically resampled along azimuth and dip axes, by recalculating azimuthal and dip angle vectors at the interpreted grid nodes to generate 3D volumes as $\vec{\varnothing}(x, y, z)$ and $\vec{\alpha}(x, y, z)$. The generated ADCIG can be partially stacked along selected dip-traces within a (min, max) threshold that is defined by the interpreted dip (i.e., diversity stacking, weighted with a windowing function before stacking). The resultant multi-azimuth data can be partially stacked to produce common-azimuth-tiles, for example, for displaying fractures and faults. In some other implementations, to generate reflection-angle gathers, the traces can be further cumulated along all dip-azimuth tiles.

The reflection-angle map (RAM) generated by well-logs and ray-based modeling can include reflection-angles computed for every geology interface. These reflection angles can be resampled vertically for the output image grid as θ(x, y, z) and used as a guide to define its (min, max) range, for example, for reflection-enhancement and muting of post-critical reflections. The processed reflection-angle gathers are useful, for example, for updating the anisotropy velocity model, by applying residual moveout analysis along azimuthal direction and updating the isotropy velocity model without the azimuthal contributions.

In some implementations, the post-processing of the ADCIG can include applying a phase-alignment filter to flatten reflection events in the opening-angle domain. This assumes the velocity model for producing the ADCIG is correct and wherever residual NMO of events occurs and is caused by irregular illuminating geometry. The phase-alignment filter can flatten reflection events along the opening-angle axis and suppress artifacts caused by irregular survey geometry.

Table 3 shows an example interpretation-based, post-processing algorithm to enhance subsurface images. The example post-processing algorithm includes processing of both horizon-picks and reflection-angle-map (RAM) information. In some implementations, a post-processing algorithm can include fewer, more, or different operations. For instance, when external guide data are not available (e.g., lacking surface seismic interpretation and well-log data), some example techniques can be applied, which can include (1) estimating a 1-D velocity model from either zero- or near-offset VSP data, (2) migrating data with the 1-D velocity model for both up- and down-going energies, (3) picking horizons and residual moveouts to update velocity in the angle domain, (4) iterating migration and velocity updates in an iterative fashion, (5) generating ADCIG for the final velocity model, and (6) post-processing to enhance ADCIG.

TABLE 3

Example interpretation-based post-processing algorithm for ADCIG

LOAD ADCIG containing hit counts
LOAD velocity model V(x, y, z)
LOAD horizon-picks T(x, y) obtained from interpretation
LOAD reflection-angle-map (RAM): θ(x, y, z) from modeling (option)
LOOP over (x, y) position of ADCIG
   STRETCH depth to time (option)
   RESAMPLE horizon-picks along azimuth and dip axes
   LOOP over reflection-angles θ(α, φ, β, t) with the RAM guide
      LOOP over reflection-azimuth angles α(φ, β, t)
         LOOP over dip-angles φ(β, t) guide by interpreted-horizons
            APPLY mute function computed from velocity or RAM model
            LOOP over dip-azimuth angles β(t)
               APPLY hit-count normalization with median filter (option)
               DIVERSITY stack dip-azimuth angle traces (option)
            DIVERSITY stack dip-angle traces (option)
         PICK residual moveout to produce Δt(θ(α))
         DIVERSITY stack azimuth angle traces (option)
      ALIGNMENT of reflection events
      DIVERSITY stack reflection-angle traces (option)
PRODUCE ADCIG I(x, y, t, θ)
PRODUCE structure images I(x, y, t)/I(x, y, t, α)/I(x, y, t, θ)/I(x, y, t, φ)
PRODUCE residual moveout file Δt(x, y, θ(α))

Figure 10:
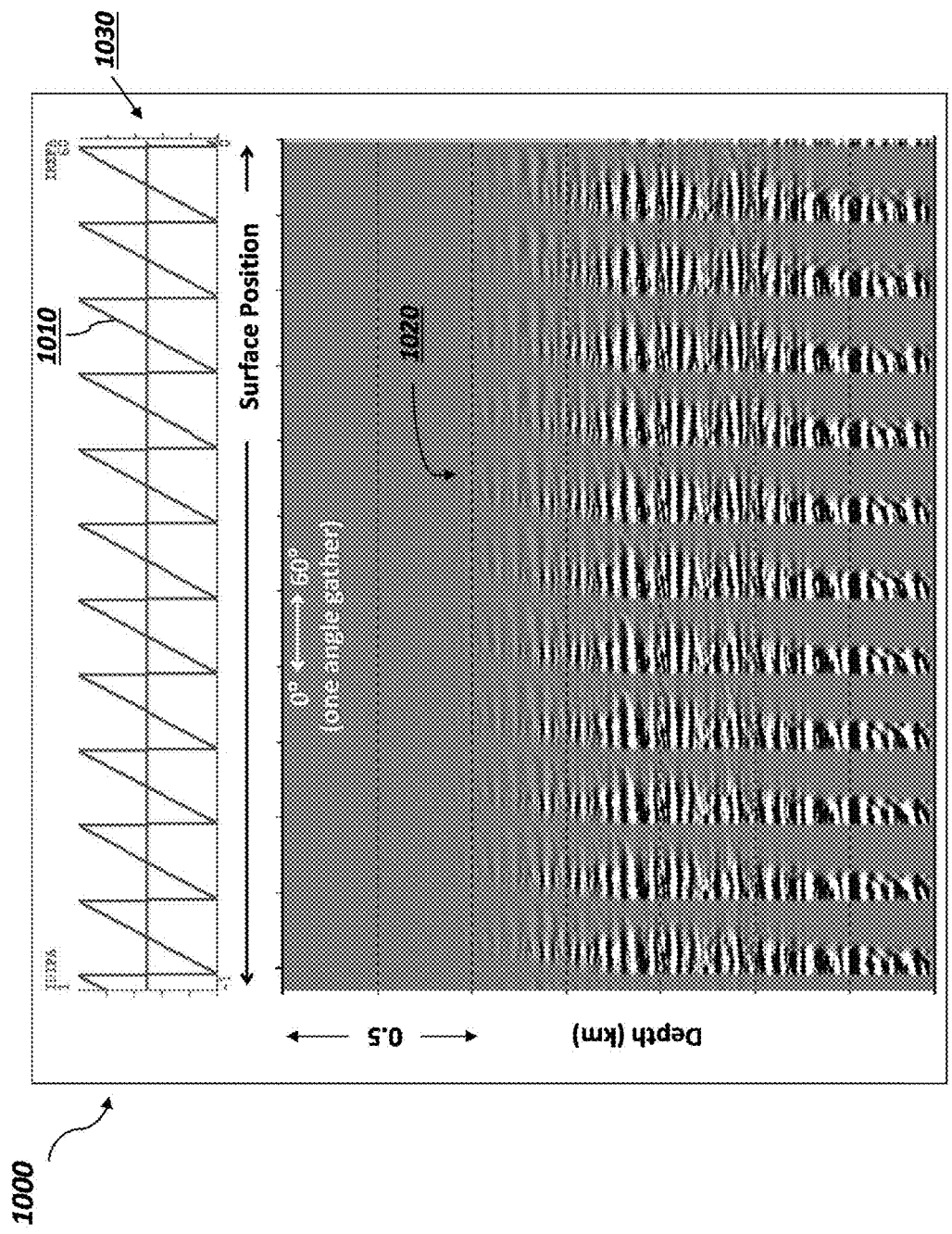
FIG. 10 is a plot showing example processed reflection-angle gathers after applying the phase-alignment filter.

FIGS. 10-13 show example applications of the post-processing techniques to enhance structure images. FIG. 10 is a plot 1000 showing example processed reflection-angle gathers after applying the phase-alignment filter. In this example, the generated ADCIG data are firstly stacked along three axes (dip, reflection-azimuth, and dip-azimuth). The output ADCIG 1020 contains reflection-angle gathers at 11 surface locations, with fixed distance interval along one inline. Traces of each reflection-angle gather are produced between opening angles 0°~60°. The subplot 1030 above the angle gathers 1020 shows a chain-saw curve 1010 representing the opening angles between 0°~60°.

Figure 11:
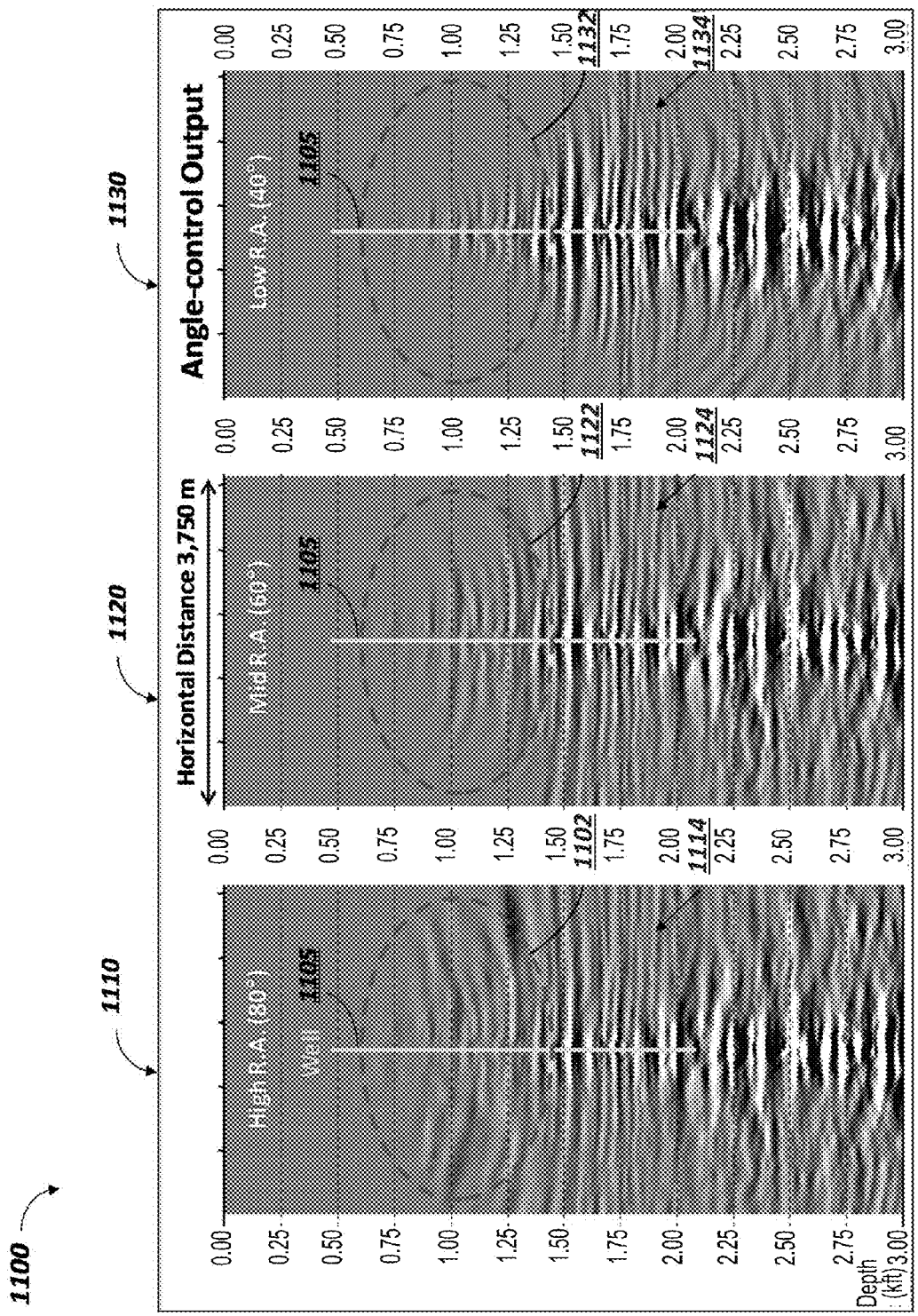
FIG. 11 includes three plots showing an example result of suppressing migration artifacts with selected dip and opening angles.

FIG. 11 includes three plots 1110, 1120, and 1130 showing an example result of suppressing migration artifacts with stacking of less reflection angles. In this example, the 4D ADCIG are first stacked along three directions: dip angle, reflection-azimuth angle, and dip-azimuth angle to produce the reflection angle gathers. The well is shown as 1105. Additional stacking along the reflection angle axis for values ranging in (0°~80°), (0°~60°), and (0°~40°) are shown as images 1114, 1124, 1134 in plots 1110, 1120, and 1130, respectively. As illustrated, wider reflection angles can generate noticeable lower spatial resolution at shallow depth above 1.5 km (e.g., as shown in the circled area 1102 of plot 1110), while, lower reflection angles reduced significant "swing" artifacts with less lateral extension (e.g., as shown in the circled area 1132 of plot 1130). Such artifacts can be suppressed with a horizon-based post-processing process (e.g., the example algorithm described with respect to Table 1) that focuses only on selected dip and reflection angle ranges to produce the final stack. The central plot 1120 shows the final stacked image (e.g., in the circled area 1122) with suppressed migration artifacts by diversity stacking reflection angles ranging 0°~60°.

Figure 12:
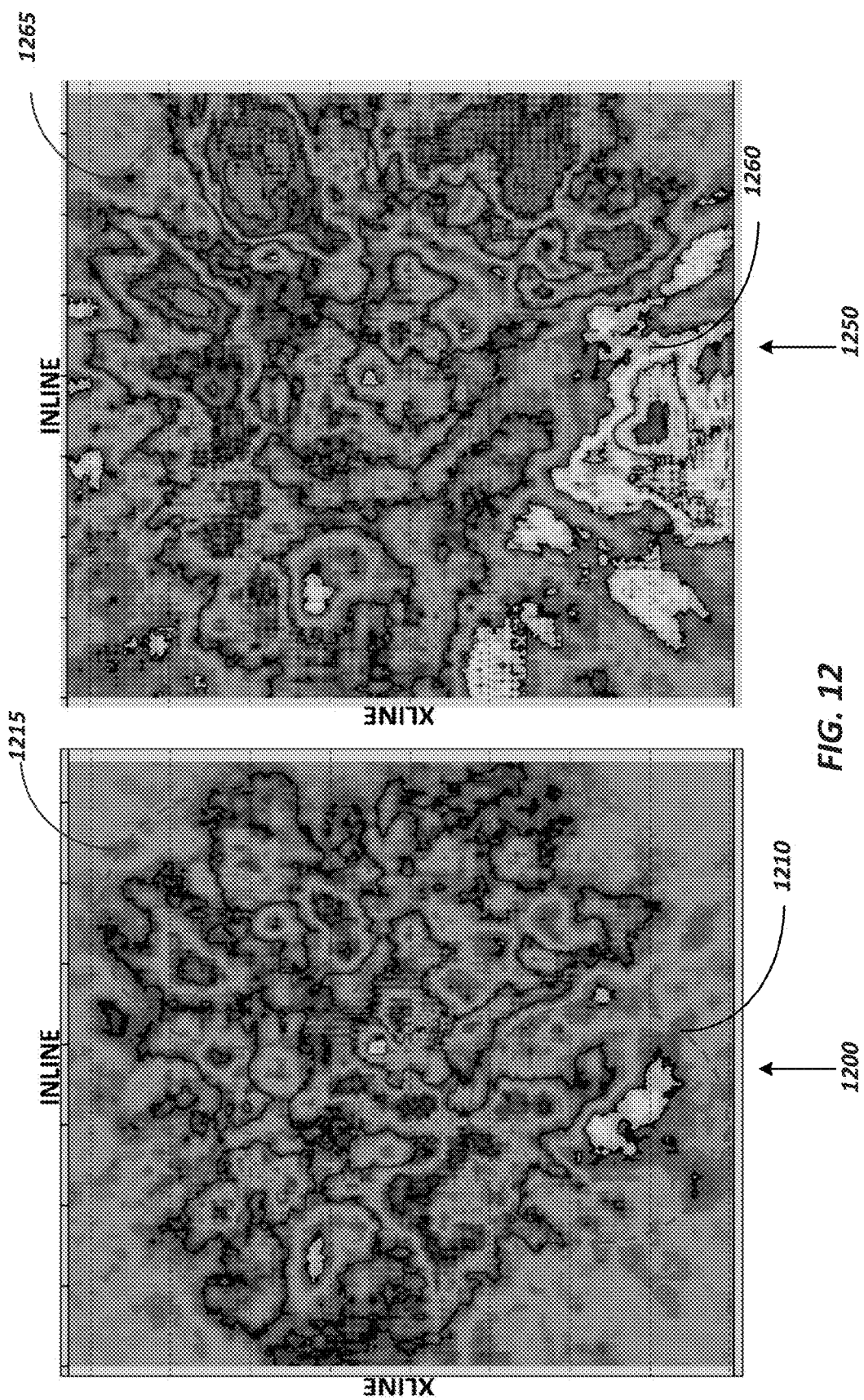
FIG. 12 includes plots showing map views of key amplitudes of constant time slices along two reflection angular ranges.

FIG. 12 includes plots 1200 and 1250 showing map views of key amplitudes of constant time slices along two angular ranges. The plot 1200 shows the stack of ADCIG at constant time slice after the alignment of reflection events between opening angles of 30° and 40°, while the plot 1250 shows the stack of ADCIG at constant time slice after the alignment of reflection events between opening angles of 35° and 45°. Amplitude variations versus reflection angles can be observed in two circled areas 1210, 1215 and 1260, 1265 of the two plots, respectively: the amplitudes are stronger in higher reflection angles in these areas.

Figure 13:
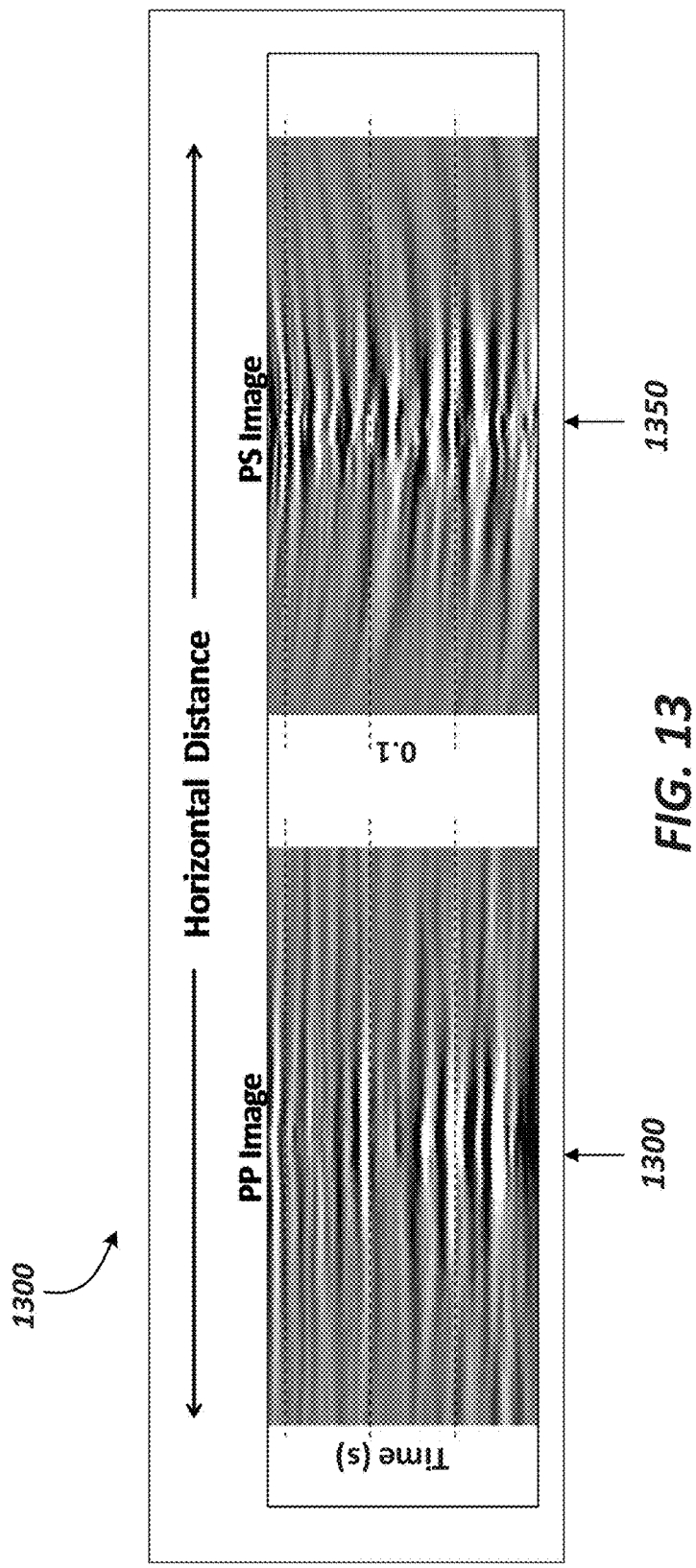
FIG. 13 includes plots showing examples of Kirchhoff imaging of PS-data in converted/stretched time domain.

FIG. 13 includes plots 1300 and 1350 showing examples of Kirchhoff imaging of PS-data using two velocity models (Vp and Vs) in the vertical time domain. The plot 1300 shows the PP images and the plot 1350 shows the PS image. Note the resolution of PS image is higher than the PP image. In some implementations, another pass of updating the S-wave velocity model can be used to flatten the PS-images.

Figure 14:
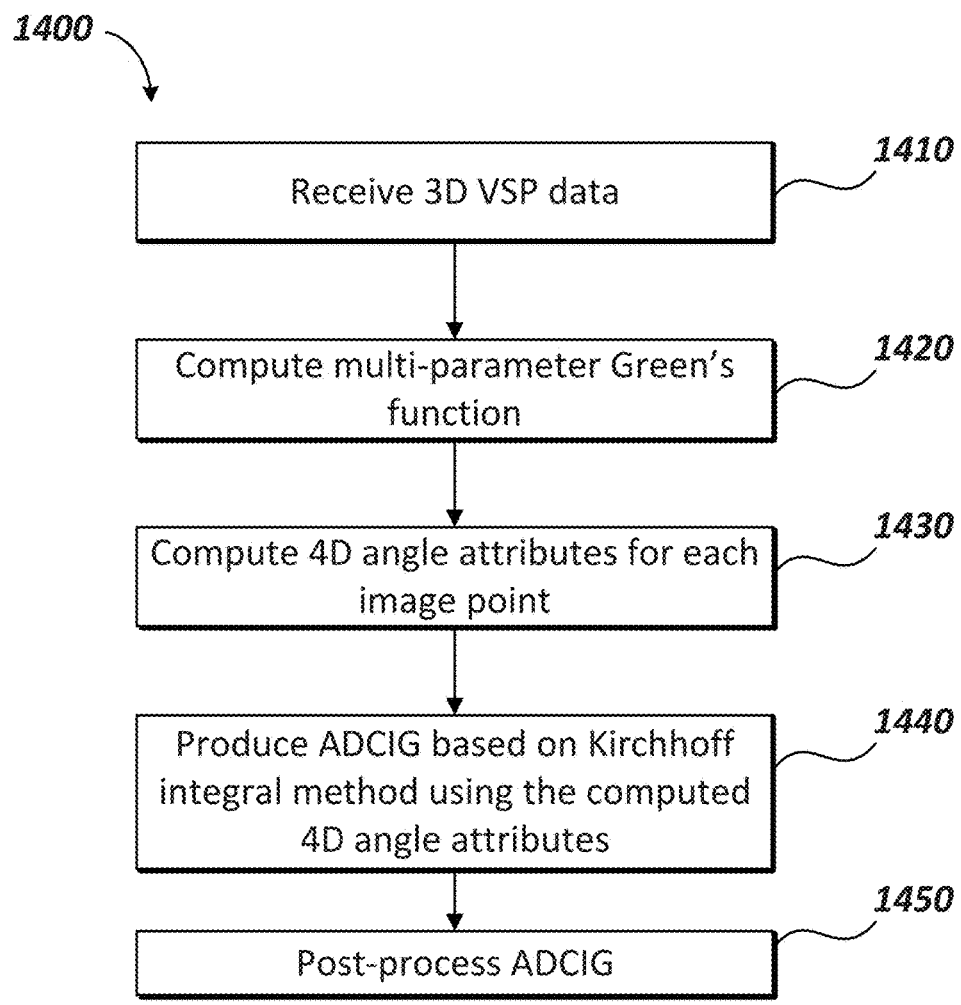
FIG. 14 is a flow chart showing an example process for processing 3D VSP data for reservoir analysis.

FIG. 14 is a block flow chart showing example process 1400 for processing 3D VSP data for reservoir analysis. The process 1400 can be implemented, for example, as computer instructions stored on computer-readable media and executable by data processing apparatus (for example, one or more processor(s) of the computer system 150 in FIG. 1). In some implementations, some or all of the operations of process 1400 can be distributed to be executed by a cluster of computing nodes, in sequence or in parallel, to improve efficiency.

At 1410, VSP data of a subterranean region can be acquired. The VSP data can be 3D VSP data collected, for example, by downhole receivers (e.g., the downhole receivers 120 in FIG. 1) during a 3D VSP survey conducted by a well survey system (e.g., the well survey system 100 in FIG. 1). The 3D VSP data can be received by the data processing apparatus (e.g., one or more processor(s) of the computer system 150 in FIG. 1). In some implementations, the 3D VSP data can be stored in a computer-readable media (e.g., memory) and the processing apparatus can load the 3D VSP data from the computer-readable media. The 3D VSP data can include, for example, input data traces D(S, R, T) with a source location S, receiver location R, and the travel time T for multiple image points. The 3D VSP data can include other information acquired by multi-component sensors, such as vector geophone and scalar hydrophone, to reveal elastic properties of subsurface reflectors via directionality of wave motion and variation of pressure fields.

At 1420, multi-parameter Green's function can be computed. For example, the data processing apparatus can compute multi-parameter tables of Green's function based on the example techniques described with respect to Table 2, or in another manner. For example, the four angle attributes for each image point can be computed based on initial velocity models (isotropy and anisotropy) for the received VSP data. In some implementations, the multi-parameter Green's function is computed based on ray-tracing for the VSP survey geometry covering all surface source and borehole receiver positions, in either depth or vertical time domain, via a simple velocity function that enables ADCIG to be produced in depth or vertical time domain useful for residual moveout analysis. In some implementations, computing multi-parameter Green's function includes generating multi-parameter tables in separated files associated with surface sources and borehole receivers for various velocity models (compressional Vp and shear Vs models) and Thomsen anisotropic parameters (e.g., epsilon, delta, and eta) independently, which can be used for imaging multi-component PP and PS data collected at surface and/or borehole positions. In some implementations, travel time shadow zones are infilled based on a two-point ray-tracing algorithm to compute Green's function between any point in the shadow zones and the source and/or receiver position.

At 1430, four angle attributes for each image point can be computed based on the received VSP data. The four angle attributes can include, for example, a reflection angle, reflection-azimuth angle, dip angle, and dip-azimuth angle. The data processing apparatus can compute the four angle attributes according to the example techniques described with respect to FIGS. 1-5, especially the Equations (2)-(6). In some implementations, the data processing apparatus can compute the four angle attributes in another manner. In some implementations, each of the four angle attributes can be computed for a full 0°~360° range, or another specified range, as needed.

At 1440, ADCIG can be generated according to a ray-equation method (e.g., Kirchhoff integral method) based on the four angle attributes. In some implementations, the ray-equation based Kirchhoff integral method uses a composite velocity model containing the original and its mirror-image duplicates for imaging primary reflection and free surface multiples received in typical VSP data simultaneously. In some implementations, the data processing apparatus can generate 5D ADCIG based on the example algorithms described with respect to Table 2, or in another manner.

Figure 15:
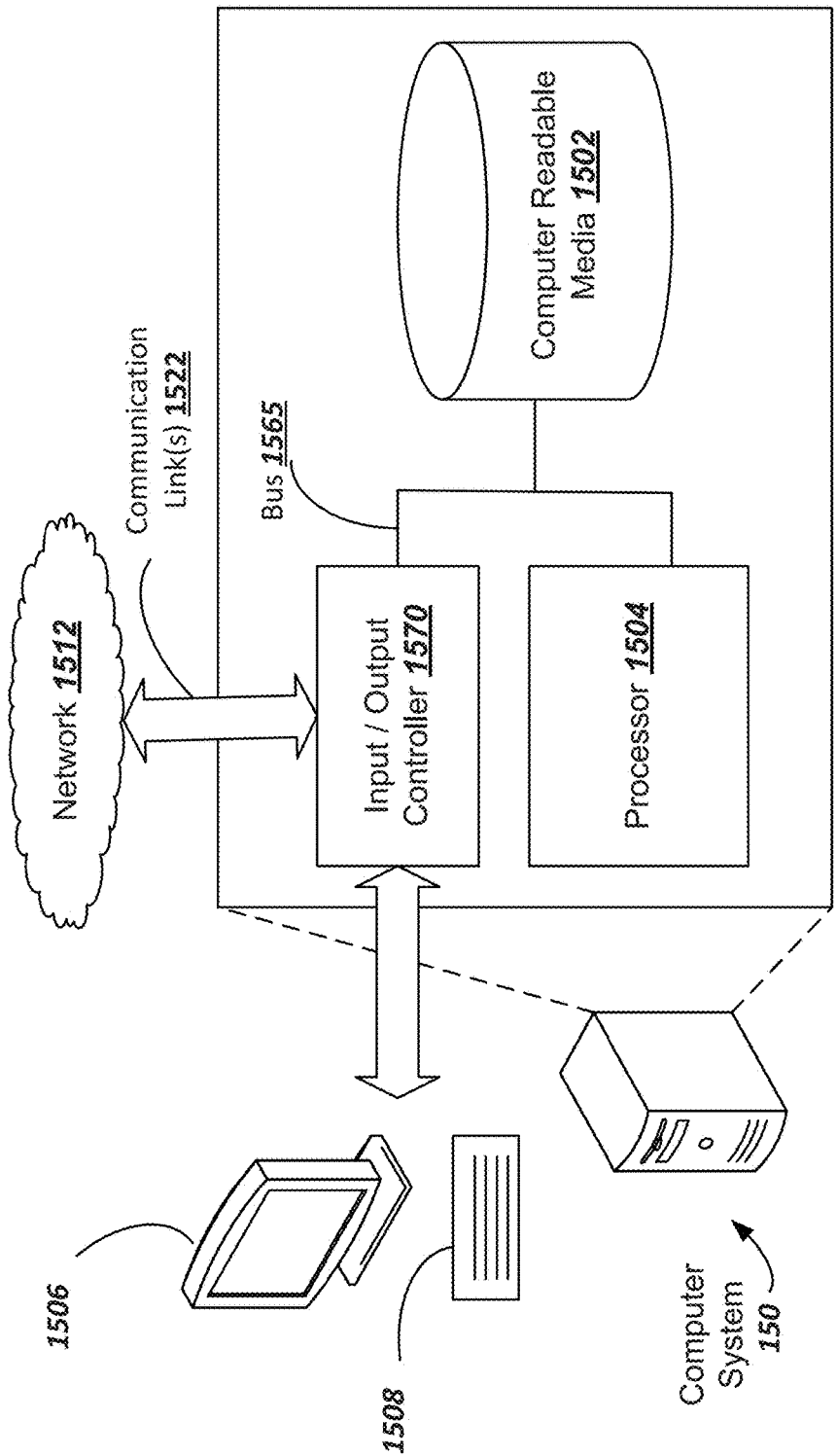
FIG. 15 is a schematic showing the example computer system of FIG. 1.

At 1450, the generated ADCIG can be post-processed. For instance, the data processing apparatus can implement one or more of the various post-processing techniques, such as those described with respect to FIGS. 6-8 and 10-13, for example, to enhance structure images and angle gathers for interpretation and rock property estimation, and handle irregular illumination geometry of the VSP data. In some implementations, post-processing the generated ADCIG includes one or more of: imaging down-going energies using dip-angle range (90°~180°) for associated free surface multiples of the VSP data; imaging up-going energies using dip-angle range)(0°~90° for associated primary reflections; or imaging multi-component data, the multi-component data including one or more of PP-data, SS-data, or PS-data by weighting stack of dip-angles of ADCIG produced for P-wave and S-wave independently containing both up and down-going waves; anti-aliased migration smiles by lowering frequency content of higher dip angles; blending results of surface and VSP data in a seamless fashion for integrated-interpretation and inversion by weighted-stack of two similar dip-angles in ADCIGs; amplitude normalization with "hit counts" being registered in migration for balancing irregular illumination caused by the asymmetric source-receiver offset in the VSP survey. FIG. 15 illustrates a schematic of the example computer system 150 of FIG. The example computer system 150 can be located at or near one or more well survey system(s), or at a remote location. The example computer system 150 includes a data processing apparatus 1504 (e.g., one or more processors), a computer-readable medium 1502 (e.g., a memory), and input/output controllers 1570 communicably coupled by a bus 1565. The computer-readable medium can include, for example, a random access memory (RAM), a storage device (e.g., a writable read-only memory (ROM) and/or others), a hard disk, and/or another type of storage medium. The computer system 150 can be preprogrammed and/or it can be programmed (and reprogrammed) by loading a program from another source (e.g., from a CD-ROM, from another computer device through a data network, and/or in another manner). The input/output controller 1570 is coupled to input/output devices (e.g., the display device 1506, input devices 1508 (e.g., keyboard, mouse, etc.), and/or other input/output devices) and to a network 1512. The input/output devices receive and transmit data in analog or digital form over communication link(s) 1522, such as a serial link, wireless link (e.g., infrared, radio frequency, and/or others), parallel link, and/or another type of link.

The network 1512 can include any type of data communication network. For example, the network 1512 can include a wireless and/or a wired network, a Local Area Network (LAN), a Wide Area Network (WAN), a private network, a public network (such as the Internet), a WiFi network, a network that includes a satellite link, and/or another type of data communication network.

In some implementations, vertical seismic profiling (VSP) surveys not only provide higher-frequency data than that acquired using ocean bottom sensor (OBS) (also referred to as ocean bottom cable (OBC)) methods, but they can also be analyzed for reservoir properties via seismic inversion of angle gathers. OBS surveys, on the other hand, provide better lateral subsurface illumination coverage than VSP surveys. Integrating VSP and OBS data in depth imaging can produce results which improve or optimize the interpretation effort, for example, increased vertical resolution of OBS images, to better delineate subtle geologic features such as sand stringers.

Figure 16:
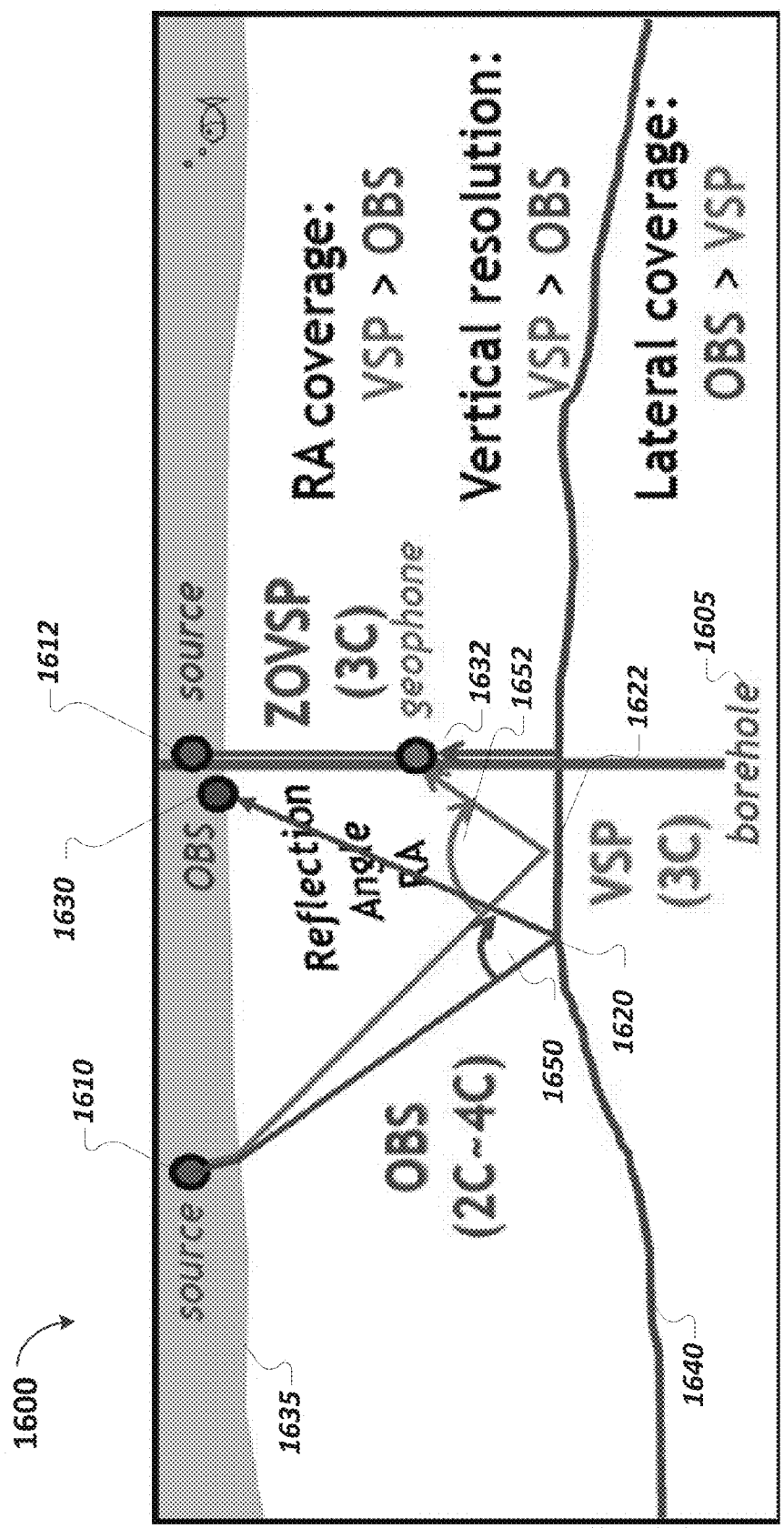
FIG. 16 is a diagram showing an example well survey system and associated VSP data and ocean bottom sensor (OBS) data.

FIG. 16 is a diagram 1600 showing example VSP and OBS data of an example well survey system. OBS data can be collected by deploying a number of recording devices (for example, each with one three component (3C) geophone and one hydrophone) that are configured as streamer on an ocean floor to receive seismic signals released from an acoustic air-gun source fired near the sea surface. As shown in FIG. 16, OBS data can be collected by deploying a receiver (e.g., a streamer) 1630 on an ocean floor 1635 to receive seismic signals released from an acoustic air-gun source 1610, fired near the sea surface and reflected by a reflector 1620 on the subsurface 1640, with a reflection angle (RA) 1650. Multiple streamers can be deployed in 3D survey to collect subsurface reflections. As these OBS sensors or cables can be dragged along the ocean floor 1635, large subsurface area can be covered with the OBS survey. In other words, the OBS data can have a wider lateral coverage than the VSP data.

In contrast, VSP data are collected with a single vertical cable deployed in the borehole, so VSP survey can cover only limited subsurface area around the borehole 1605. FIG. 16 shows example zero offset VSP (ZOVSP) data that can be collected by deploying a receiver (e.g., a geophone) 1632 in the borehole 1605 to receive seismic signals released from an acoustic air-gun source 1612 fired near the sea surface and reflected by the subsurface 1640. The surface source 1612 has a zero offset in the horizontal direction relative to the borehole receiver 1632. The regular reflection recorded in VSP data has following geometry: 1) acoustic air-gun source 1610, 2) reflector 1622, 3) a borehole receiver 1632 and 4) a RA 1652.

VSP data can have a larger RA coverage and better vertical resolution than OBS data as VSP data are less contaminated with surface multiples and have much higher frequency than OBS data, due to less attenuation through nearly one-wave propagation. Thus, VSP data can be a better tool for characterizing reservoir near the well and OBS data can be further constrained by VSP data for area beyond the VSP coverage. Combing both VSP and OBS information enables better reservoir characterization.

In some implementations, preprocessing of VSP and OBS data can be different as VSP data contain distinct down and up-going energies that are separable, while OBS data contain more indistinguishable down and up travelling energies that cannot be easily separated. In some implementations, VSP data can be processed first and then used as a guide for processing OBS data.

In some implementations, OBS data can be imaged or otherwise processed in a similar manner as the VSP data. For example, the above-mentioned migration method (e.g., the Kirchhoff-based prestack depth migration method) can be used for imaging VSP and OBS data to produce ADCIG. Generated ADCIG can be post-processed, for example, for enhancement of structure images, separation of images for up- and down-going waves for enhancing shallow reflections, imaging mode-converted data such as PS mode-converted energies for rock-property analysis with improved resolution, improving irregular subsurface illumination, target-oriented structure enhancements, or other applications.

As an example, multi-component seismic data can be useful for imaging reservoir rocks with more estimated elastic properties such as compressional-wave velocity (Vp), shear-wave velocities (Vs) and anisotropic parameters that can be useful for fracture detection and mapping stress-field through seismic inversion. As described above, both PS and PP imaging methods can follow a similar algorithm, except that PS imaging uses two travel time tables and PP imaging uses one table. To image PS components (or PS-data) of VSP data, two travel time tables are to be produced, at first, by computing ray-fields (angles, amplitudes, travel time) for 1) surface sources for P-wave velocity (Vp) model and 2) borehole receivers for S-wave velocity (Vs) model, respectively. The first table includes ray-field (or Green's function) computed from tracing rays from either source or receive position throughout the entire Vp model, while the second table is computed only for the Vs model. The ray-tracing parameters for these two models are adjusted accordingly, since the average Vs value is about half of the Vp.

Figure 17A:
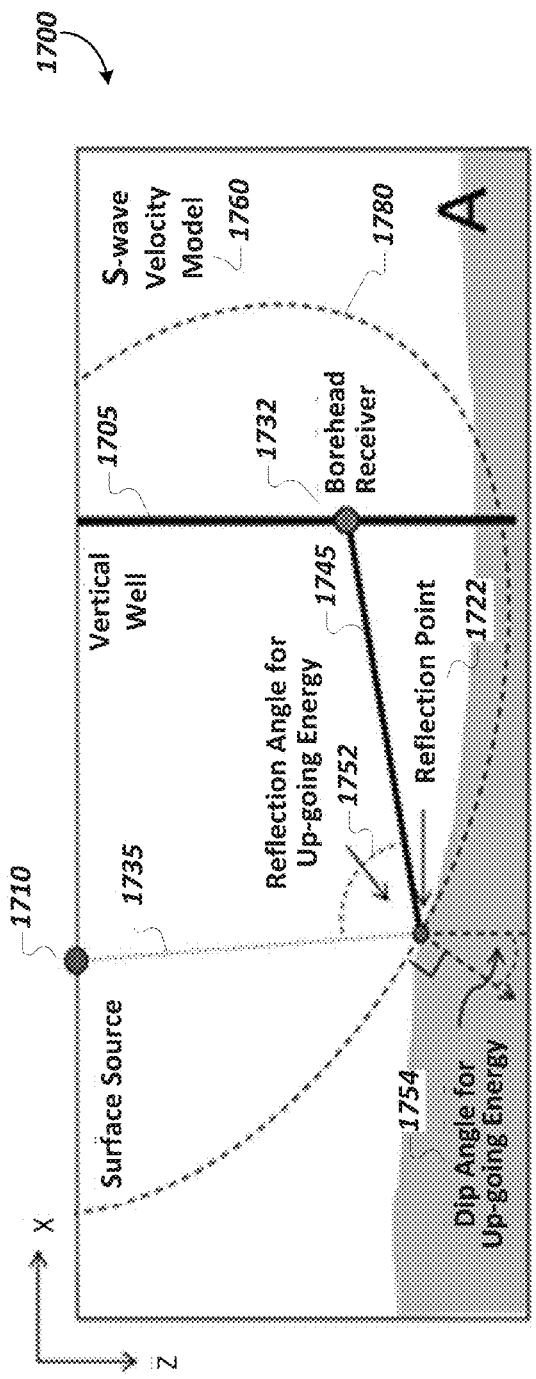
FIG. 17A is a diagram showing an example travel time table computed for a receiver for an S-wave velocity model for VSP PS data.
Figure 17B:
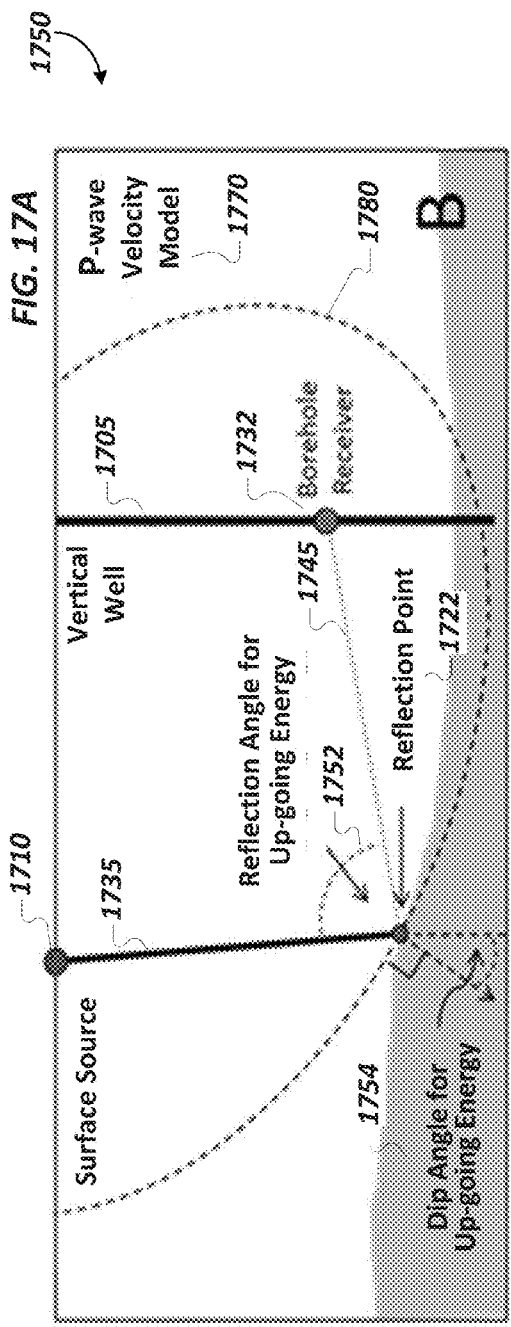
FIG. 17B is a diagram showing an example travel time table computed for a source for a P-wave velocity model for the VSP PS data.

FIG. 17A is a diagram 1700 showing an example travel time table computed for a receiver for an S-wave velocity model 1760 for VSP PS data; FIG. 17B is a diagram 1750 showing an example travel time table computed for a source for a P-wave velocity model 1770 for the VSP PS data. Specifically, the total VSP PS data reflection path can include a first ray path (or a tracing ray) 1735 from a surface source 1710 to a reflector or reflection point 1722 and a second ray path 1745 from the reflector 1722 to a borehole receiver 1732, arranged in a vertical well 1705. The second ray path 1745 between the borehole receiver 1732 and the reflection point 1722 in FIG. 17A represents the travel path through S-wave velocity model. The first ray path 1735 between the surface source 1710 and the reflection point 1722 in FIG. 17B represents the travel path through P-wave velocity model. The first ray path 1735 and the second ray path 1745 defines an RA 1752 and a dip angle (DA) 1754 for the up-going energy.

Prior to migration, two travel time tables are summed in an attribute-by-attribute/sample-by-sample manner to produce the total-time-imaging-condition (TTIC as an ellipsoid trajectory 1780) for imaging the PS component of the VSP data. In some implementations, in migration, each sample of the PS component of VSP data collected at different source and receiver positions, is distributed throughout the entire 3D image space along the ellipsoid trajectory 1780. Thus, the TTIC defines the mapping mechanism (i.e., an ellipsoid surface with source and receiver sits at the foci points)

between the reflection energy recorded in seismic data and all possible spatial positions in the image space.

FIG. 18A is a diagram 1800 showing an example travel time table computed for a receiver via an S-wave velocity model 1860 for OBS PS data; FIG. 18B is a diagram 1850 showing an example travel time table computed for a source via a P-wave velocity model 1870 for the OBS PS data. Specifically, the total OBS PS data reflection path can include a first ray path (or a tracing ray) 1835, from a surface source 1810 to a reflector 1820, and a second ray path 1845, from the reflector 1820 to a surface receiver 1830. The second ray path 1845 between the surface receiver 1830 and the reflection point 1820 in FIG. 18A represents the travel path through S-wave velocity model. The first ray path 1835 between the surface source 1810 and the reflection point 1820 in FIG. 18B represents the travel path through P-wave velocity model. The first ray path 1835 and the second ray path 1845 define an RA 1852 and a DA 1854 for the up-going energy. Similarly, in migration of the OBS PS-data can include summing two travel time tables pre-computed for each different source and receiver positions to produce the total time imaging condition (TTIC 1880) at first, followed by distributing amplitude of each sample of PS data along associated TTIC throughout the entire 3D image space. The final ADCIG is produced when all samples of input PS data are distributed and accumulated in the image space in a sample-by-sample or attribute-by-attribute fashion.

Table 4 shows an example algorithm for imaging PS data. The example algorithm can be applied to both VSP and OBS data. Specifically, two tables are read and stored in the computer memory. In migration of each trace, two corresponding tables (a source and receiver pair) are summed to produce an image via the TTIC.

TABLE 4

Example algorithm for imaging PS data.

READ table file produced for source positions with ray-tracing
READ table file produced for receiver positions with ray-tracing
LOOP over every input data trace
    PREPROCESS trace (scaling, differentiation, filtering, etc..)
    SUM attribute (traveltime) from two tables
    LOOP over every sample (x, y, τ) or (x, y, z) position within aperture
        RESAMPLE multi-attribute tables
        COMPUTE full angle attributes
        COMPENSATE spreading loss
        APPLY anti-alias filtering
        DISTRIBUTE and cumulate data amplitudes on full angle gather
        CUMULATE and attach hit-count to every trace of full angle gather
    STORE full angle gather with hit-count in computer memory
WRITE full angle gathers with hit-counts in disk file In some implementations, to blend depth migrated images for both 3D VSP and OBS data in a seamless fashion, it is more advantageous to blend the common image-point gathers (CIG) in the image angle domain than the conventional offset domain. In some implementations, blending OBS and VSP images can be achieved by selecting the same dip-angle ranges for both ADCIG in a post-processing workflow. In some instances, setting the same dip-angle ranges of the ADCIG of the OBS data and the ADCIG of VSP data can work similarly to anti-alias filtering in a Kirchhoff method.

Figure 19:
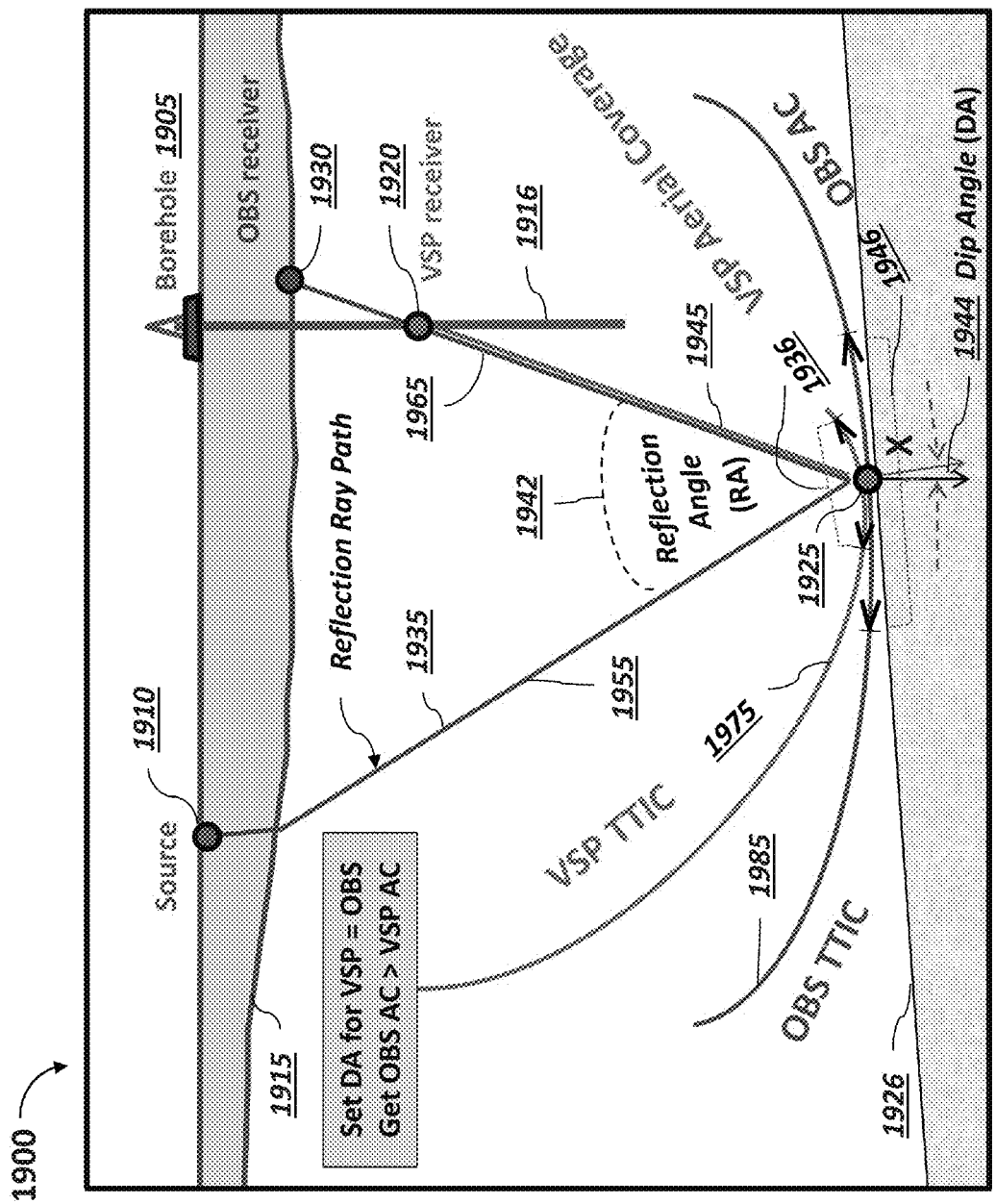
FIG. 19 is a diagram showing example VSP and OBS data of a well survey system for processing in an angle domain.

FIG. 19 is a diagram 1900 showing example VSP and OBS data of a well survey system for processing in an angle domain. As illustrated, the VSP data include a first ray path (or a tracing ray) 1935 from a surface source 1910 to a reflector 1925 on a subsurface 1926 and a second ray path 1945 from the reflector 1925 to a borehole receiver 1920, arranged in a vertical well 1916 in a borehole 1905. The OBS data include a first ray path 1955 from the surface source 1910 to the reflector 1925 and a second ray path 1965 from the reflector 1925 to a surface receiver 1930 on an ocean floor 1915. In the example shown in FIG. 19, the first ray path 1935 of the VSP data and the first ray path 1955 of the OBS data coincide, and the second ray path 1945 of the VSP data and the second ray path 1965 of the OBS data coincide partially. Accordingly, the VSP data and the OBS data have the same RA 1942. However, the VSP data and the OBS data may have different total travel time trajectories (TTIC) and different ranges of the DA (dip-angles) and are carefully selected for blending in post-processing. As shown in FIG. 19, the aerial coverage 1936 of VSP TTIC 1975 is narrower than the aerial coverage 1946 of OBC TTIC 1985 by fixing the same DA range as the illuminating area is generally narrower in VSP than the OBS survey.

In some implementations, since OBS and VSP data are collected via two survey designs with different aerial sizes and coverages, an unified 3D subsurface mesh (rectangular grid) can be defined that honors all survey geometries (i.e., source and receiver (x, y, z) positions) of two data sets. During imaging, all input seismic data with true (x, y, z) position are migrated to produced ADCIG at unified grid locations. The velocity models produced for OBC and VSP data are to be resampled to fit the unified grid.

In some implementations, combining the OBS and VSP images in post-processing can include summing the angle attributes of the ADCIG generated based on the VSP data and the ADCIG generated based on the OBS data that are in the same range. For example, a same dip angle range for stacking the ADCIG generated based on the VSP data and the ADCIG generated based on the OBS data can be identified. The ADCIG generated based on the VSP data and the ADCIG generated based on the OBS data that fall within the same angle range can be stacked.

In some implementations, combining the OBS and VSP images in post-processing can further include balancing frequency and amplitudes of two images before final summation.

Figure 20:
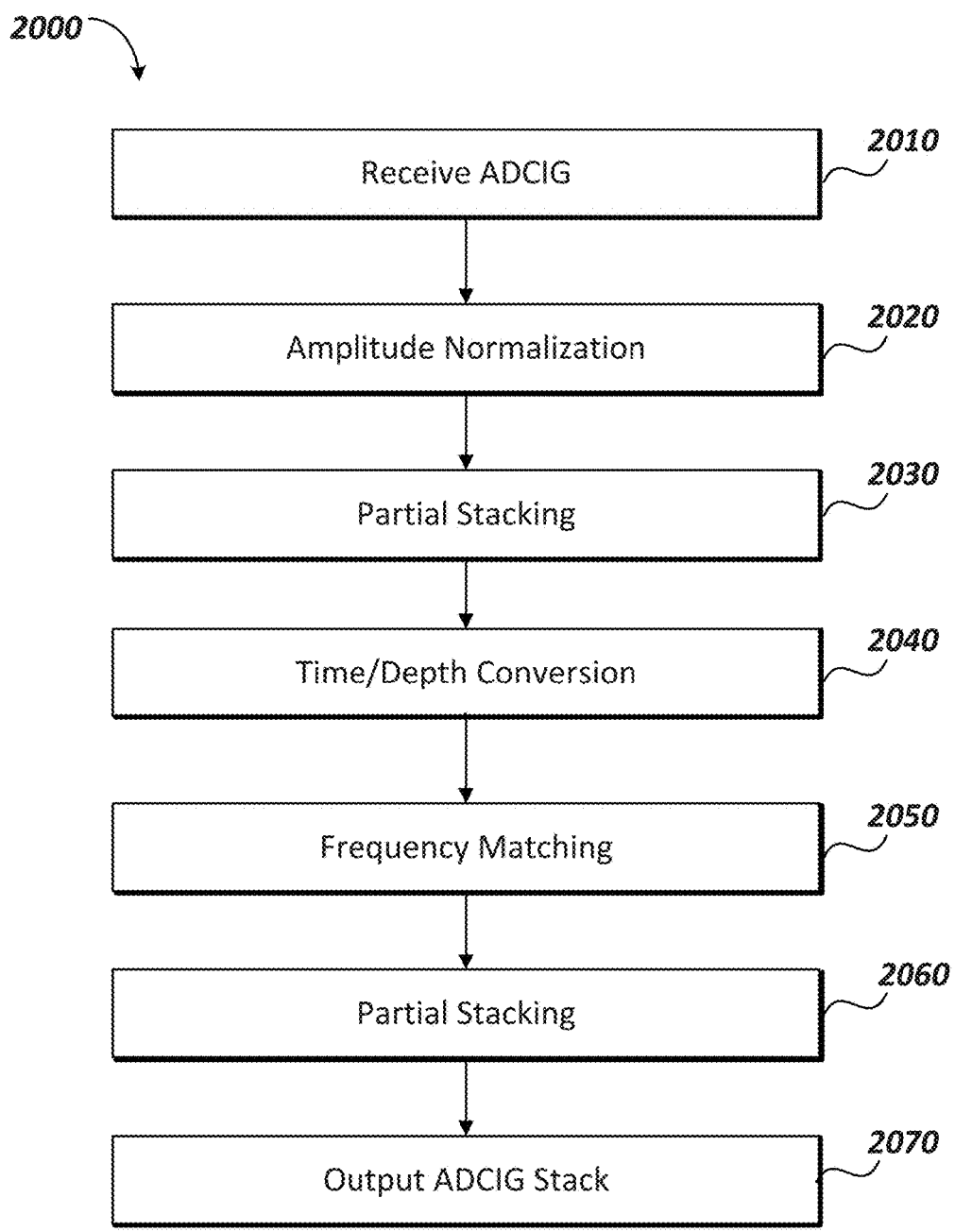
FIG. 20 is a flow chart showing an example process for post-processing of VSP data and OBS data for reservoir analysis.

FIG. 20 is a flow chart showing example process 2000 for post-processing of VSP data and OBS data for reservoir analysis. The process 2000 can be implemented, for example, as computer instructions stored on computer-readable media and executable by data processing apparatus (for example, one or more processor(s) of the computer system 150 in FIG. 15). In some implementations, some or all of the operations of process 2000 can be distributed to be executed by a cluster of computing nodes, in sequence or in parallel, to improve efficiency.

At 2010 in FIG. 20, ADCIG can be received. The input ADCIG can include ADCIG generated based on VSP data and ADCIG generated based on OBS data, for example, according to the example techniques described with respect to FIG. 14. The VSP data and the OBS data can be received by the data processing apparatus (e.g., one or more processor(s) of the computer system 150 in FIG. 15). In some implementations, the VSP data and the OBS data can be stored in a computer-readable media (e.g., memory) and the processing apparatus can load the VSP data and the OBS data from the computer-readable media.

At 2020 in FIG. 20, amplitude normalization can be performed. For example, the data processing apparatus can normalize the amplitudes of the ADCIG generated based on the VSP data and the ADCIG generated based on the OBS data. In some implementations, the data processing apparatus can normalize the amplitudes of the two types of ADCIG by 1) scaling by the operator (i.e., TTIC) hit-counts at each subsurface grid point for each data set (i.e., OBC and VSP) independently and 2) compensating according to ratio of RMS amplitudes between groups of traces extracted from two ADCIG for OBC and VSP data. Normalization can be critical for balancing OBC and VSP data before blending together since illumination folds between OBC and VSP surveys are very different for the common zone of interests.

At 2030 in FIG. 20, partial-stacking is performed. For example, the data processing apparatus can stack or sum the normalized ADCIG generated based on the VSP data and the normalized ADCIG generated based on the OBS data. In some implementations, the stacking is performed on the normalized ADCIG generated based on the VSP data and the normalized ADCIG generated based on the OBS data that share a same angle range (e.g., a same RA or DA range).

Figure 21:
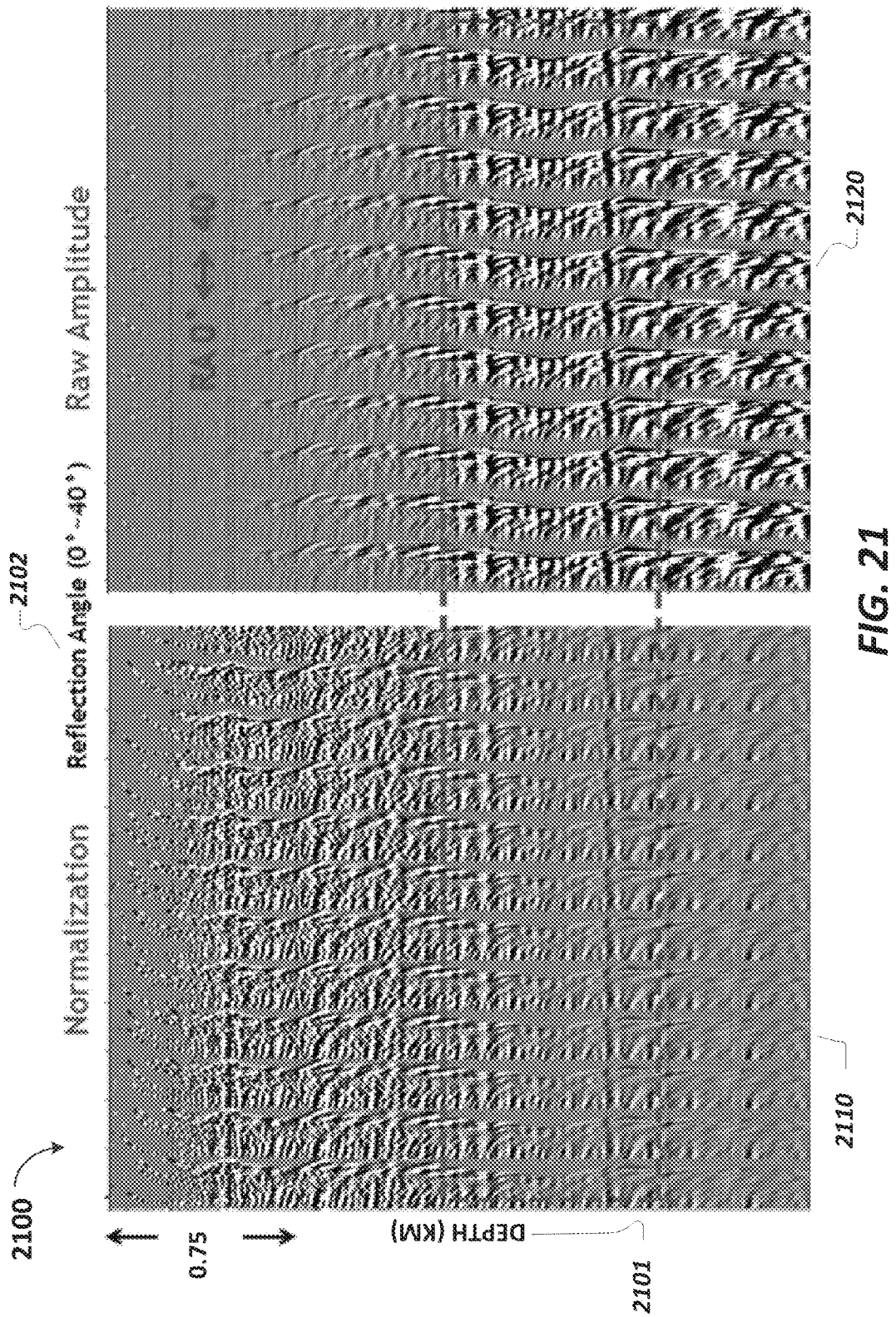
FIG. 21 is a plot showing an example effect of amplitude normalization of the image data.

FIG. 21 is a plot 2100 showing an example effect of amplitude normalization of the image data. The vertical axis 2101 represents the depth and the horizontal axis 2102 represents a reflection angle range (0°~40°) at a series of horizontal positions. The subplot 2110 shows example partial-stacked ADCIG after amplitude normalization, whereas the subplot 2120 shows example partial-stacked ADCIG without normalization (original amplitude). The partial-stacked ADCIG includes the ADCIG generated based on the VSP data and the ADCIG generated based on the OBS data that share the same dip angle range (0°~20°).

At 2040 in FIG. 20, time/depth conversion is performed. For example, the data processing apparatus can convert the vertical depth axis of the ADCIG into a vertical time axis for the input single velocity model, or vice versa. Conversion to vertical time domain help interpretations and velocity analysis. The data processing apparatus can perform the time/depth conversion on the ADCIG generated based on the VSP data and the ADCIG generated based on the OBS data. When two velocity models are used for imaging the mode-converted PS data, it is advantageous to produce the ADCIG directly in the vertical-time domain to avoid any ambiguity in depth/time conversion involving two velocity models after migration. This is critical for converting the ADCIG of VSP PS data, as asymmetric ray path caused by source and receiver geometries for different velocity models cannot be easily restored or reconstructed after the migration, which makes the time/depth conversion impossible. The only way to handle PS data with complex survey geometry (i.e. VSP data) is to image these mode-converted data in the vertical-time domain as described in equation 7.

At 2050 in FIG. 20, frequency matching is performed. For example, the data processing apparatus can match the frequency (or frequency range) of the ADCIG generated based on the VSP data with the frequency (or frequency range) of the ADCIG generated based on the OBS data. The data processing apparatus can perform the frequency matching on the ADCIG, for example, by boosting the OBC data to wider frequency bandwidth as the VSP data; or by suppressing the VSP bandwidth to fit the OBC data. Frequency matching is computed in the running-window fashion similar to the amplitude balancing flow described above. Balanced frequency and amplitude data can be blended together for an integrated interpretation and inversion for rock properties.

At 2060 in FIG. 20, partial-stacking is performed. For example, the data processing apparatus can stack or sum the frequency-matched ADCIG generated based on the VSP data and ADCIG generated based on the OBS data. In some implementations, the stacking is performed on the frequency-matched two types of ADCIG that share a same angle range (e.g., a same RA range).

Figure 22:
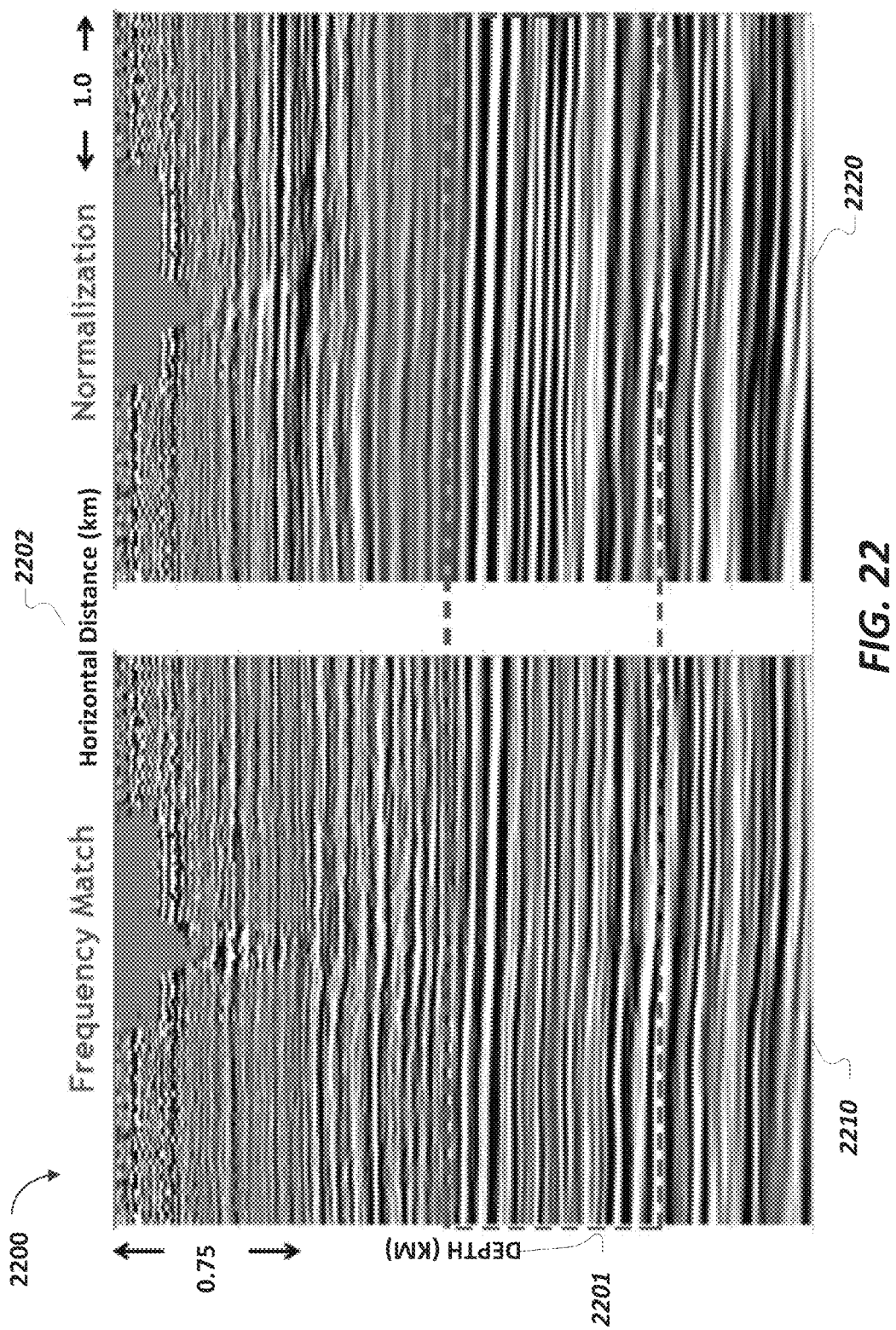
FIG. 22 is a plot showing a plot showing an example effect of frequency matching of the image data.

FIG. 22 is a plot 2200 showing an example effect of frequency matching of the image data. The vertical axis 2201 represents the depth and the horizontal axis 2202 represents a horizontal distance (in km). The subplot 2210 shows example partial-stacked ADCIG after frequency matching, whereas the subplot 2220 shows example partial-stacked ADCIG with amplitude normalization, but without frequency matching. The partial-stacked ADCIG includes the ADCIG generated based on the VSP data and the ADCIG generated based on the OBS data that share the same reflection angle range (0°~40°).

At 2070 in FIG. 20, post-processed ADCIG are output. In some instances, the post-processed ADCIG can be the combined ADCIG based on the VSP data and the OBS data. For example, the post-processed ADCIG can be the ADCIG that are stacked after frequency matching, at 2060 of FIG. 20. In some implementations, one or more of the operations 2010-2060 of FIG. 20 can be optionally performed. The post-processed ADCIG can be the ADCIG that have undergone the corresponding performed operations. The data processing apparatus can output the post-processed ADCIG by representing the post-processed ADCIG in a user-interface (e.g., in one or more plots shown in FIGS. 21-23), transmitting the post-processed ADCIG to another device, or storing the post-processed ADCIG into a file or other medium.

Figure 23:
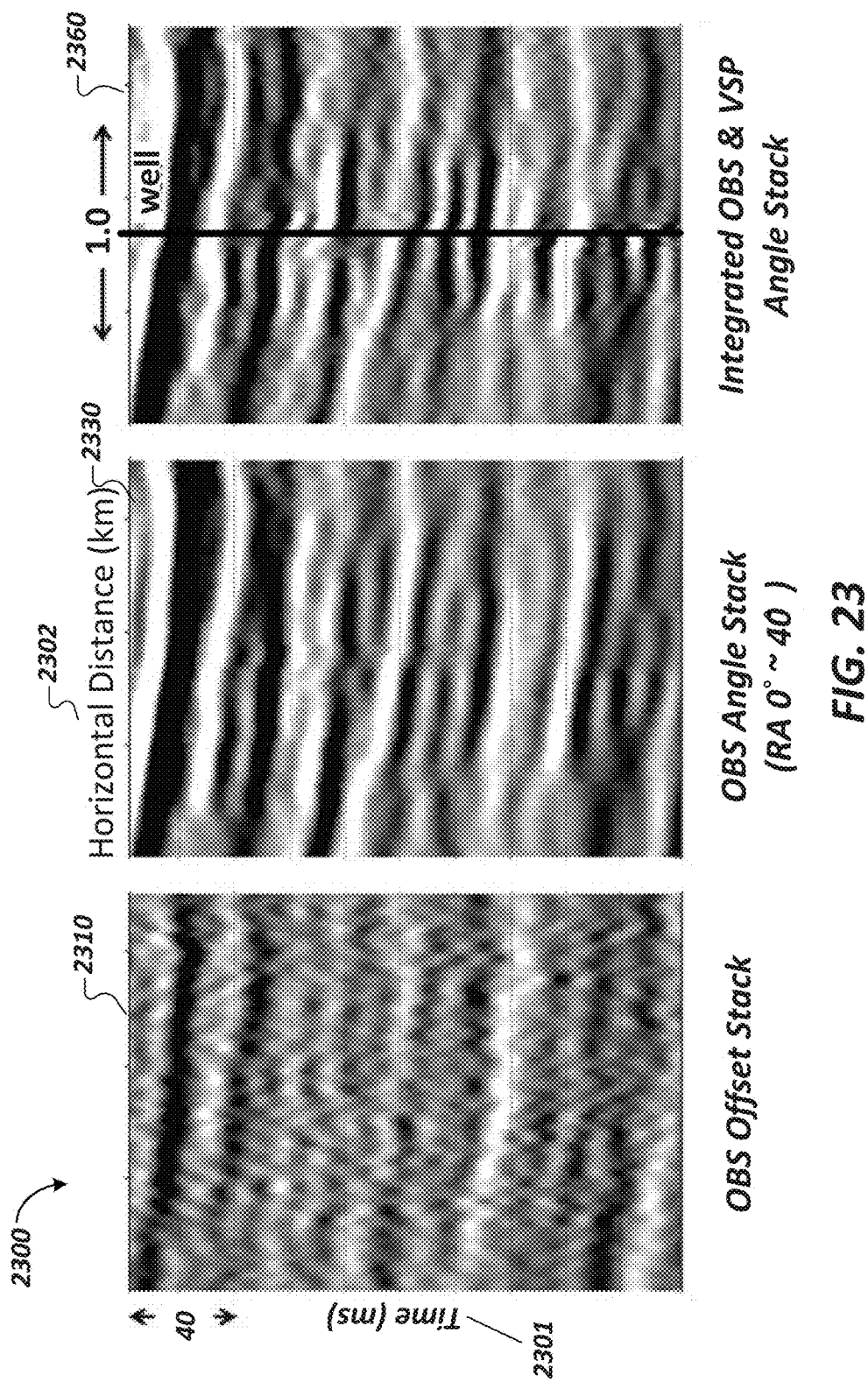
FIG. 23 is a plot showing a plot showing an example comparison among structure images obtained by different stacking of the image data.

FIG. 23 is a plot showing a plot 2300 showing an example comparison among structure images obtained by different stacking of the image data. The vertical axis 2301 represents the time and the horizontal axis 2302 represents a horizontal distance (in km). The subplot 2310 shows an example of a structure image obtained by stacking common-offset-gather (COG) of OBS migrated data. The subplot 2330 shows an example of a structure image obtained by stacking of ADCIG of OBS migrated data over a RA range of (0°~40°). The subplot 2360 shows example a structure image obtained by integrated angle stacking of both OBS data and VSP data. As illustrated, the structure image obtained by integrated angle stacking of both OBS data and VSP data has the best imaging result among the three in revealing highest resolution in the target zone.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

While this disclosure contains many specific implementation details, these should not be construed as limitations on the scope of any implementations or of what may be claimed, but rather as descriptions of features specific to particular implementation of particular implementations. Certain features that are described in this disclosure in the context of separate implementations can also be implemented in combination, in a single implementation. Conversely, various features that are described in the context of a single implementation can also be implemented in multiple implementations, separately or in any suitable subcombination. Moreover, although features may be described above as acting in certain combinations, and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
receiving, by data processing apparatus, vertical seismic profile (VSP) data of a subterranean region, the VSP data comprising reflection ray paths of incident rays from a surface source to a reflector and from the reflector to a borehole receiver, and comprising locations of the surface source, the reflector and the borehole receiver;
computing, by the data processing apparatus, angle attributes for each image point of a plurality of image points based on the received VSP data;
generating, by the data processing apparatus, angle-domain common-image gathers (ADCIG) according to a ray-equation method, based on the angle attributes computed based on the received VSP data;
migrating mode-converted energy PS-data of the received VSP data in a time domain; wherein the migrating mode-converted energy PS-data of the received VSP data in a time domain comprises migrating mode-converted energy PS-data of the received VSP data in a depth or a vertical domain by:
storing a first multi-parameter table for the surface source for a P-wave velocity model for PS-data of the received VSP data in a first file;
storing a second multi-parameter table for the borehole receiver for an S-wave velocity model for the PS-data of the received VSP data in a second file;
summing the first multi-parameter table for the surface source for the P-wave velocity model for the PS-data of the received VSP data and the second multi-parameter table for the borehole receiver for an S-wave velocity model for the PS-data of the received VSP data; and
migrating each sample of the PS-data of the received VSP data for every sample of the ADCIG via an associated total-time-imaging-condition; and
computing a multi-parameter Green's function based on ray-tracing for a composited velocity model containing both a regular and its mirror-image component for handling primary reflection and free surface multiples simultaneously.

2. The method of claim 1, wherein the computing angle attributes for each image point of the plurality of image points based on the received VSP data comprise computing angle attributes for primary reflection and free surface multiples for each image point of the plurality of image points based on the received VSP data and one or both of an initial isotropic model or an anisotropic velocity model.

3. The method of claim 1, further comprising:
receiving, by the data processing apparatus, ocean bottom sensor (OBS) data of the subterranean region, the OBS data comprising reflection ray paths of incident rays from the surface source to a second reflector and from the second reflector to an ocean floor receiver, and comprising information of the locations of the surface source, the second reflector and the ocean floor receiver;
computing, by the data processing apparatus, angle attributes for primary reflection and free surface multiples for each image point of a plurality of image points based on the received OBS data and one or both of an initial isotropic model or an anisotropic velocity model;
generating, by the data processing apparatus, OBS-data-based ADCIG according to a ray-equation method based on the angle attributes computed based on the received OBS data; and
migrating mode-converted energy PS-data of the received OBS data in a depth or a vertical time domain.

4. The method of claim 3, wherein the migrating mode-converted energy PS-data of the received OBS data in a vertical time domain comprises:
storing a third multi-parameter table for the surface source for a P-wave velocity model for PS-data of the received OBS data in a third file;
storing a fourth multi-parameter table for the ocean floor receiver for an S-wave velocity model for the PS-data of the received OBS data in a fourth file;

summing the third multi-parameter table for the surface source for the P-wave velocity model for the PS-data of the received OBS data and the fourth multi-parameter table for the ocean floor receiver for the S-wave velocity model for the PS-data of the received OBS data; and migrating each sample of input PS-data for every sample of the OBS-data-based ADCIG via a total-time imaging condition.

5. The method of claim 3, further comprising combining the ADCIG generated based on the received VSP data and the OBS-data-based ADCIG generated based on the received OBS data.

6. The method of claim 5, wherein the combining the ADCIG generated based on the received VSP data and the OBS-data-based ADCIG generated based on the received OBS data comprises:

identifying a same angle range for stacking the ADCIG generated based on the received VSP data and the OBS-data-based ADCIG generated based on the received OBS data; and stacking the ADCIG generated based on the received VSP data and the OBS-data-based ADCIG generated based on the received OBS data that fall within the same angle range.

7. The method of claim 6, wherein the combining the ADCIG generated based on the received VSP data and the OBS-data-based ADCIG generated based on the received OBS data further comprises, before final stacking of the ADCIG generated based on the received VSP data and the OBS-data-based ADCIG generated based on the received OBS data, performing one or more of:

normalizing amplitudes of the ADCIG generated based on the received VSP data and the OBS-data-based ADCIG generated based on the received OBS data;

performing time-to-depth conversion of the ADCIG generated based on the received VSP data and the OBS-data-based ADCIG generated based on the received OBS data when a depth migration was implemented; or performing frequency matching of the ADCIG generated based on the received VSP data and the OBS-data-based ADCIG generated based on the received OBS data.

8. A non-transitory computer-readable medium storing instructions executable by a computer system to perform operations comprising:

receiving vertical seismic profile (VSP) data of a subterranean region, the VSP data comprising reflection ray paths of incident rays from a surface source to a reflector and from the reflector to a borehole receiver, and comprising locations of the surface source, the reflector and the borehole receiver;

computing angle attributes for primary reflection and free surface multiples for each image point of a plurality of image points based on the received VSP data and one or both of an initial isotropic model or an anisotropic velocity model;

generating angle-domain common-image gathers (ADCIG) according to a ray-equation method, based on the angle attributes computed based on the received VSP data;

migrating mode-converted energy PS-data of the received VSP data in a depth or a vertical time domain; wherein the migrating mode-converted energy PS-data of the received VSP data in a time domain comprises migrating mode-converted energy PS-data of the received VSP data in a depth or a vertical domain by:

storing a first multi-parameter table for the surface source for a P-wave velocity model for PS-data of the received VSP data in a first file;

storing a second multi-parameter table for the borehole receiver for an S-wave velocity model for the PS-data of the received VSP data in a second file;

summing the first multi-parameter table for the surface source for the P-wave velocity model for the PS-data of the received VSP data and the second multi-parameter table for the borehole receiver for an S-wave velocity model for the PS-data of the received VSP data; and migrating each sample of the PS-data of the received VSP data for every sample of the ADCIG via an associated total-time-imaging-condition; and computing a multi-parameter Green's function based on ray-tracing for a composited velocity model containing both a regular and its mirror-image component for handling primary reflection and free surface multiples simultaneously.

9. The medium of claim 8, wherein the computing the multi-parameter Green's function comprises generating multi-parameter tables in separated files for imaging multi-component data.

10. The medium of claim 8, the operations further comprising:

receiving, by the data processing apparatus, ocean bottom sensor (OBS) data of the subterranean region, the OBS data comprising reflection ray paths of incident rays from the surface source to a second reflector and from the second reflector to an ocean floor receiver, and comprising information of the locations of the surface source, the second reflector and the ocean floor receiver;

computing, by the data processing apparatus, angle attributes for primary reflection and free surface multiples for each image point of a plurality of image points based on the received OBS data and one or both of an initial isotropic model or an anisotropic velocity model;

generating, by the data processing apparatus, OBS-data-based ADCIG according to a ray-equation medium based on the angle attributes computed based on the received OBS data; and migrating mode-converted energy PS-data of the received OBS data in a depth or a vertical time domain.

11. The medium of claim 10, wherein the migrating mode-converted energy PS-data of the received OBS data in a vertical time domain comprises:

storing a third multi-parameter table for the surface source for a P-wave velocity model for PS-data of the received OBS data in a third file;

storing a fourth multi-parameter table for the ocean floor receiver for an S-wave velocity model for the PS-data of the received OBS data in a fourth file;

summing the third multi-parameter table for the surface source for the P-wave velocity model for the PS-data of the received OBS data and the fourth multi-parameter table for the ocean floor receiver for the S-wave velocity model for the PS-data of the received OBS data; and migrating each sample of input PS-data for every sample of the OBS-data-based ADCIG via a total-time imaging condition.

12. The medium of claim 10, the operations further comprising combining the ADCIG generated computed based on the received VSP data and the OBS-data-based ADCIG generated based on the received OBS data.

13. The medium of claim 12, wherein the combining the ADCIG generated based on the received VSP data and the OBS-data-based ADCIG generated based on the received OBS data comprises:
- identifying a same angle range for stacking the ADCIG generated based on the received VSP data and the OBS-data-based ADCIG generated based on the received OBS data; and
- stacking the ADCIG generated based on the received VSP data and the OBS-data-based ADCIG generated based on the received OBS data that fall within the same angle range.

14. The medium of claim 13, wherein the combining the ADCIG generated based on the received VSP data and the OBS-data-based ADCIG generated based on the received OBS data further comprises, before final stacking of the ADCIG generated based on the received VSP data and the OBS-data-based ADCIG generated based on the received OBS data, performing one or more of:
- normalizing amplitudes of the ADCIG generated based on the received VSP data and the OBS-data-based ADCIG generated based on the received OBS data;
- performing time-to-depth conversion of the ADCIG generated based on the received VSP data and the OBS-data-based ADCIG generated based on the received OBS data when a depth migration was implemented; or
- performing frequency matching of the ADCIG generated based on the received VSP data and the OBS-data-based ADCIG generated based on the received OBS data.

15. A system comprising one or more computers that include:
- memory operable to store vertical seismic profile (VSP) data of a subterranean region; and
- data processing apparatus operable to:
  - receive VSP data of the subterranean region, the VSP data comprising reflection ray paths of incident rays from a surface source to a reflector and from the reflector to a borehole receiver, and comprising locations of the surface source, the reflector and the borehole receiver;
  - compute angle attributes for primary reflection and free surface multiples for each image point of a plurality of image points based on the received VSP data and one or both of an initial isotropic model or an anisotropic velocity model;
  - generate angle-domain common-image gathers (ADCIG) according to a ray-equation method, based on the angle attributes computed based on the received VSP data;
  - migrate mode-converted energy PS-data of the received VSP data in a depth or a vertical time domain; wherein the migrating mode-converted energy PS-data of the received VSP data in a time domain comprises migrating mode-converted energy PS-data of the received VSP data in a depth or a vertical domain by:
    - storing a first multi-parameter table for the surface source for a P-wave velocity model for PS-data of the received VSP data in a first file;
    - storing a second multi-parameter table for the borehole receiver for an S-wave velocity model for the PS-data of the received VSP data in a second file;
    - summing the first multi-parameter table for the surface source for the P-wave velocity model for the PS-data of the received VSP data and the second multi-parameter table for the borehole receiver for an S-wave velocity model for the PS-data of the received VSP data; and
    - migrating each sample of the PS-data of the received VSP data for every sample of the ADCIG via an associated total-time-imaging-condition; and
  - compute a multi-parameter Green's function based on ray-tracing for a composited velocity model containing both a regular and its mirror-image component for handling primary reflection and free surface multiples simultaneously.

16. The system of claim 15, the memory further operable to store ocean bottom sensor (OBS) data of the subterranean region; and the data processing apparatus operable to:
- receive the OBS data of the subterranean region, the OBS data comprising reflection ray paths of incident rays from the surface source to a second reflector and from the second reflector to an ocean floor receiver, and comprising information of the locations of the surface source, the second reflector and the ocean floor receiver;
- compute angle attributes for primary reflection and free surface multiples for each image point of a plurality of image points based on the received OBS data and one or both of an initial isotropic model or an anisotropic velocity model;
- generate OBS-data-based ADCIG according to a ray-equation medium based on the angle attributes computed based on the received OBS data; and
- migrate mode-converted energy PS-data of the received OBS data in a depth or a vertical time domain.

* * * * *